US008061951B2

(12) United States Patent
Marston et al.

(10) Patent No.: US 8,061,951 B2
(45) Date of Patent: Nov. 22, 2011

(54) APPARATUS FOR TIPPING INTERMODAL CONTAINERS

(75) Inventors: Harold Marston, Midvale, UT (US); Mickelle Marston, legal representative, Midvale, UT (US); Ron Piccolo, Price, UT (US); Matthew Craig Hillyer, Louisville, MS (US); Tonnie Michael Boyles, Louisville, MS (US); Darry Cecil Crowell, Louisville, MS (US)

(73) Assignee: WCDI, LLC, Midvale, UT (US)

( * ) Notice: Subject to any disclaimer, the term of this patent is extended or adjusted under 35 U.S.C. 154(b) by 82 days.

(21) Appl. No.: 12/420,662

(22) Filed: Apr. 8, 2009

(65) Prior Publication Data

US 2009/0257853 A1 Oct. 15, 2009

Related U.S. Application Data

(60) Provisional application No. 61/043,656, filed on Apr. 9, 2008.

(51) Int. Cl.
*B65G 65/34* (2006.01)

(52) U.S. Cl. ..... 414/421; 414/641; 414/782; 294/68.26; 294/81.51

(58) Field of Classification Search .......... 414/419–421, 414/639–642, 767, 779, 782; 294/68.26, 294/68.27, 68.3, 86.41
See application file for complete search history.

(56) References Cited

U.S. PATENT DOCUMENTS

| | | | | | |
|---|---|---|---|---|---|
| 945,625 | A | * | 1/1910 | Smith | 104/250 |
| 2,913,276 | A | * | 11/1959 | Collings | 294/65.5 |
| 2,945,609 | A | * | 7/1960 | Benes et al. | 414/626 |
| 2,999,716 | A | * | 9/1961 | Elberty | 294/86.41 |
| 3,100,123 | A | * | 8/1963 | Schmidt | 294/86.41 |
| 3,434,612 | A | * | 3/1969 | Schmidt | 414/626 |
| 3,884,376 | A | * | 5/1975 | Rivers | 414/421 |
| 4,166,647 | A | * | 9/1979 | Schmidt | 294/86.41 |
| 4,238,802 | A | | 12/1980 | Speicher | |
| 4,242,033 | A | | 12/1980 | Aidlin et al. | |
| 4,280,779 | A | * | 7/1981 | Warner et al. | 414/420 |
| 4,447,185 | A | | 5/1984 | Robinson et al. | |
| 4,496,275 | A | | 1/1985 | Harp | |
| 4,505,631 | A | * | 3/1985 | Warner et al. | 414/359 |
| 4,921,389 | A | | 5/1990 | O'Daniel | |
| 5,836,657 | A | | 11/1998 | Tilley et al. | |
| 5,895,198 | A | * | 4/1999 | Lofstrom | 414/684 |
| 6,379,104 | B1 | | 4/2002 | Domino et al. | |
| 6,558,111 | B2 | | 5/2003 | Wilson et al. | |
| 6,626,498 | B1 | | 9/2003 | Ostermeyer | |

(Continued)

OTHER PUBLICATIONS

"Containerization." *Wikipedia: The Free Encyclopedia*, Nov. 19, 2007, <http://en.wikipedia.org/wiki/Containerization>, pp. 1-9.

(Continued)

*Primary Examiner* — Gregory Adams
*Assistant Examiner* — Jonathan Snelting
(74) *Attorney, Agent, or Firm* — Morriss O'Bryant Compagni, P.C.

(57) ABSTRACT

An intermodal container tipping apparatus includes an upper support structure configured to be releasably mounted to a container transfer device, such as a reach stacker or crane, and a second support structure configured to be releasably mounted to an intermodal container. The lower supports structure includes at least one arcuate beam. The at least one arcuate beam attaches the lower support structure to the upper support structure. Movement of the at least one arcuate beam relative to the upper support structure causes tipping of the lower support structure and any load attached thereto while substantially maintaining a relative position of the center of gravity of the load.

16 Claims, 20 Drawing Sheets

U.S. PATENT DOCUMENTS 6,966,741 B2 11/2005 Gay et al.
6,968,963 B1 11/2005 Zakura, Sr. et al.
2002/0178966 A1 12/2002 Forbes

OTHER PUBLICATIONS

"Product Range: Big Trucks: Reach Stackers." *Hyster UK*, Aug. 15, 2007, <http://www.hyster.co.uk/prod_big_reach.shtml>, p. 1.

"RS Series Reach Stackers." *Taylor RS Series Reach Stackers*. Aug. 15, 2007, <http://www.taylorbigred.com/rs/> pp. 1-2.

"RS Series Reach Stacker: RS-9968C/RS 9975C/RS-9975R." *TaylorMachine Works, Inc.*, (Nov. 2006).

"Efficient Container Handling by Reachstacker." Mitsubishi Heavy Industries, Ltd, *Technical Review* vol. 42. No. 1 (Feb. 2005).

* cited by examiner

APPARATUS FOR TIPPING INTERMODAL CONTAINERS

CROSS-REFERENCE TO RELATED APPLICATION

The present invention claims priority to U.S. Provisional Patent Application Ser. No. 61/043,656, filed on Apr. 9, 2008, the entirety of which is incorporated herein by this reference.

BACKGROUND OF THE INVENTION

1. Field of the Invention

The present invention relates generally to equipment for handling intermodal and other transportation containers for transporting materials in bulk, and more particularly to an apparatus configured for attaching to and tipping containers to empty bulk materials from such containers.

2. State of the Art

Intermodal and other transportation containers are often used for transporting various materials in bulk, such as coal, grain, gravel or other materials. One particular application of the use of intermodal containers includes the transportation of waste materials bulk, including various refuse, low level radioactive materials, contaminated soils and the like. Intermodal containers are typically handled by various loading/unloading equipment to transfer the containers between transportation vehicles, such as railroad flat cars, trucks and steamships. For example, a reach stacker may be used to handle and transfer the containers between trucks and railroad flat cars, or to reposition containers in a yard. A reach stacker typically has a telescopic boom to which an expandable attachment (commonly referred to as a "spreader") is attached. The spreader includes a plurality of ISO twist locks that are configured to engage and attach to the intermodal container for lifting. A hydraulic motor and gear reduction system permit clock-wise and counter-clock-wise attachment rotation. Such spreaders are often provided with side shift, manual pile slope capabilities and adjustable guide arms. In addition, electrical safety sensors prevent the twist locks from being locked or unlocked while the spreader is "unseated" and prevent attachment extension or retraction when the twist locks are "locked" or "seated." A twist lock safety interlocking system ensures correct locking procedures. Such reach stackers are manufactured and sold by various companies including the Hyster and Taylor companies. In some instances bulk cargo must be transferred from one intermodal container into another container for shipment, processing or storage or otherwise dumped from the intermodal container. For example, contaminated soil may need to be transferred from an intermodal container to a railroad hopper car for shipment to a remote storage facility. As a result there remains a need for an efficient method of emptying intermodal containers and thereby transferring bulk material from the container into another receptacle.

One known apparatus for assisting the removal of bulk material from an intermodal container is disclosed in U.S. Pat. No. 6,966,741 to Gay et al. Gay et al. discloses an apparatus comprised of upper, middle and lower frames in which the middle and lower frames are arranged to pivot with respect to each other about an axis near one end of the frames. A winch motor is positioned on the upper frame and a cable is attached to the lower frame so that the lower frame can pivot away from the upper and middle frames and empty the contents of the intermodal container. The Gay et al. device, however, can result in unstable conditions during operation in the manner in which it lowers one side of an intermodal container relative to the other thus effectively laterally moving the center of gravity of the intermodal container. As such, there is a further need in the art to provide an intermodal container tipping apparatus that maintains lateral stability of the equipment during the tipping operation by maintaining the center of gravity of the intermodal container during a tipping operation and that is easily adaptable to various types of existing lifting equipment, such as side loaders, reach stackers, cranes, etc.

SUMMARY OF THE INVENTION

In accordance with the invention there is provided a tipping apparatus for removing bulk cargo from an intermodal container. The tipping apparatus is configured to attach to existing lifting devices such as side loaders, reach stackers, cranes and other similar equipment. The tipping apparatus can be self powered as with batteries or a generator, powered from an associated lifting device, or hard wired. The tipping apparatus according to the present invention is configured to attach to, lift and empty intermodal and other transportation containers. The intermodal containers are emptied by a rotational motion provided by the tipping apparatus.

In one embodiment of the invention, the intermodal container tipping apparatus includes a first upper support structure or frame configured to be selectively releasably mounted to a container transfer device and a second lower support structure or frame configured to be selectively releasably mounted to an intermodal container. At least one arcuate member is coupled to the second support structure and includes a plurality of gear teeth disposed on its surface. The gear teeth are configured to mate with a pinion gear that is motor driven. Rotation of the pinion gear causes lateral movement of the arcuate member relative to the first support structure and rotational movement of the second support structure relative to the first support structure.

In another embodiment of the invention, the intermodal container tipping apparatus includes an upper support structure or frame configured to be selectively releasably mounted to a container transfer device and a lower support structure or frame configured to be selectively releasably mounted to an intermodal container. A pair of arcuate members are coupled to the lower support structure. A pair of hydraulic cylinders is coupled to the upper support structure. Each hydraulic cylinder includes a freely rotating set of sprockets attached to the free end of the piston rod. A pair of laterally flexible but longitudinally rigid members, such as link-type chains, cables or similar devices known in the art (hereinafter referred to generically as "chains") are fixedly attached at one end to an outside of an arcuate member with the chains lying flat against the top surface of the arcuate member. The chains extend from their attachment points near the end of the arcutate member along a portion of the arcuate member and around the sprockets on the end of the piston rod. The opposite ends of the chains are attached to the upper support structure. The second hydraulic cylinder is similarly configured but oriented 180 degrees from the first hydraulic cylinder and coupled via the chain to the opposite arcuate member to work in tandem with the first hydraulic cylinder to control the position of the second support structure relative to the first support structure during a tipping operation according to the present invention. Thus, coordinated extension and retraction of the hydraulic cylinders causes lateral movement of the arcuate members relative to the first support structure and rotational movement of the second support structure relative to the first support structure.

In another embodiment the first support structure is configured for coupling to a first set of twist locks for releasably mounting the first support structure to a container transfer device, such as a reach stacker, lift truck or crane. A second set of twist locks are coupled to the second support structure for releasably mounting the second support structure to an intermodal container.

In still another embodiment, a roller assembly is coupled to the first support structure with the roller assembly supporting the arcuate member and its attached load. The roller assembly is comprised of a plurality of upper rollers and a plurality of lower rollers. The upper rollers engage with the top surface of the arcuate member and said lower rollers engage the bottom surface. The upper rollers define a gap therein for allowing passage of the gear teeth disposed on the arcuate member.

In yet another embodiment, the arcuate beam is semicircular in shape and has a first end attached to the second support structure at one end and extending upwardly to the first support structure. A plurality of support members couple the second end of the arcuate beam to the other end of the second support structure. The support members define an opening to allow material contained within the intermodal container to be dumped therethrough when said intermodal container is rotated to a dumping position.

In still another embodiment, the arcuate beam is semicircular in shape and has a first and second ends attached to the lower frame to allow tipping of the container in two directions.

The foregoing advantages and characterizing features will become apparent from the following description of certain illustrative embodiments of the invention. The above-described features and advantages of the present invention, as well as additional features and advantages, will be set forth or will become more fully apparent in the detailed description that follows and in the appended claims. The novel features which are considered characteristic of this invention are set forth in the attached claims. Furthermore, the features and advantages of the present invention may be learned by the practice of the invention, or will be obvious to one skilled in the art from the description, as set forth hereinafter.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION OF THE INVENTION

Figure 1:
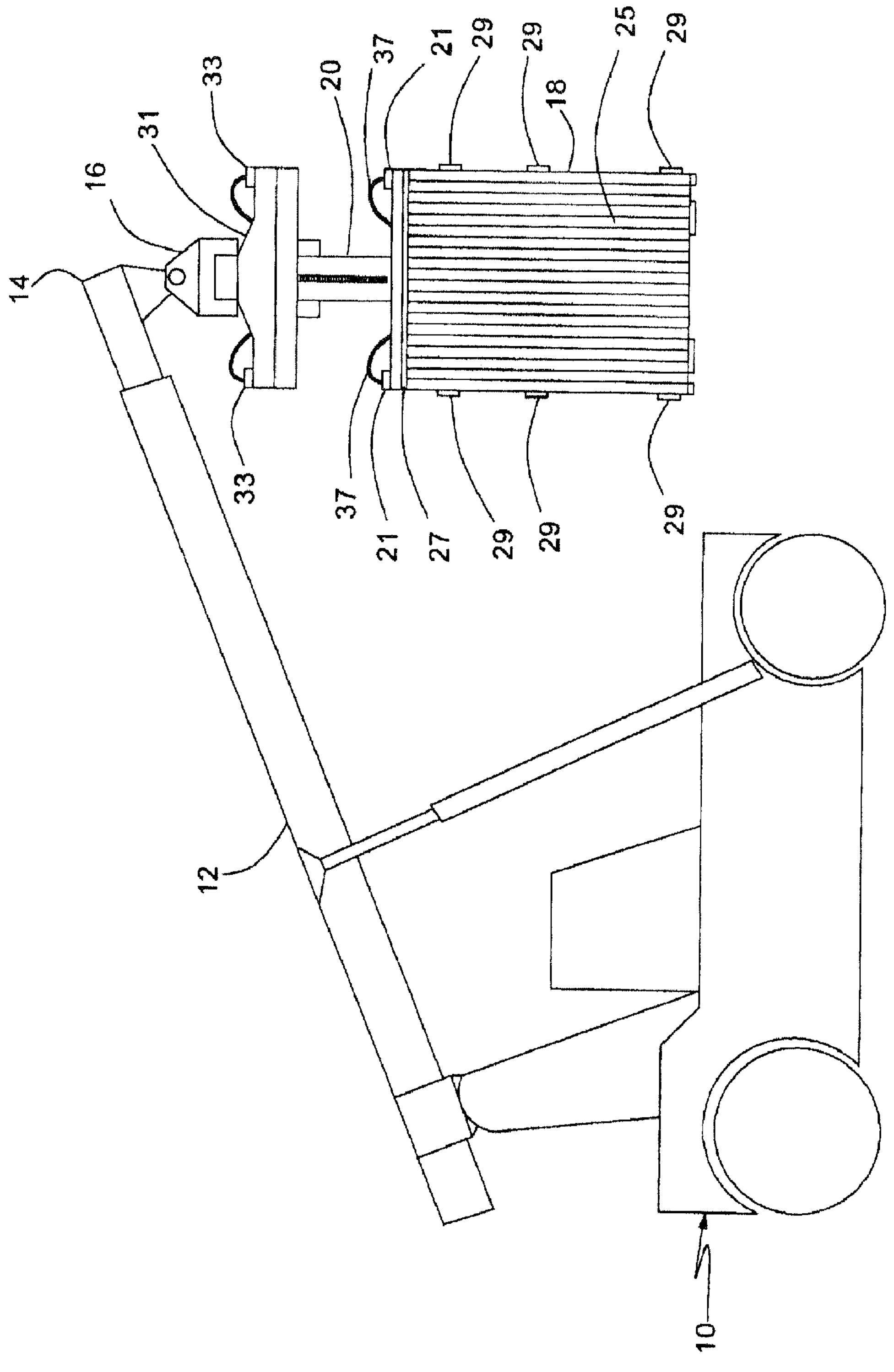
FIG. 1 is a side plan view of a reach stacker supporting a first embodiment of a container tipping apparatus in accordance with the principles of the present invention.

According to the present invention an intermodal container tipping apparatus is provided for removing bulk cargo from an intermodal container, The tipping apparatus is configured for mounting to a container transfer device such as a crane, a gantry arrangement, a reach stacker or a lift truck. For example, as shown in FIG. 1, the loading/unloading equipment may be a reach stacker 10. The reach stacker 10 is provided with a telescopic boom 12 that can be extending along its length and raised and lowered relative to the ground. Attached to the distal end 14 of the boom 12 is an expandable attachment 16 (commonly referred to as a spreader) that can be expanded laterally to attach to various width cargo containers. The spreader 16 is provided with a plurality of twist lock connectors configured for attachment to corner brackets of an intermodal container 18.

Interposed between the spreader 16 of the reach stacker 10 and container 18 is a slave spreader 20 in accordance with the principles of the present invention. The slave spreader 20 is configured with corner brackets for connecting with the twist lock connectors of the spreader 16 and twist lock connectors for engaging and attaching to corner brackets of the intermodal container 18. As will be described in more detail, the slave spreader 20 can be controlled by an operator of the reach stacker 10 and may be a self powered unit or may derive its power for actuating the slave spreader 20 using electrical and/or hydraulic power from the reach stacker 10.

Figure 2:
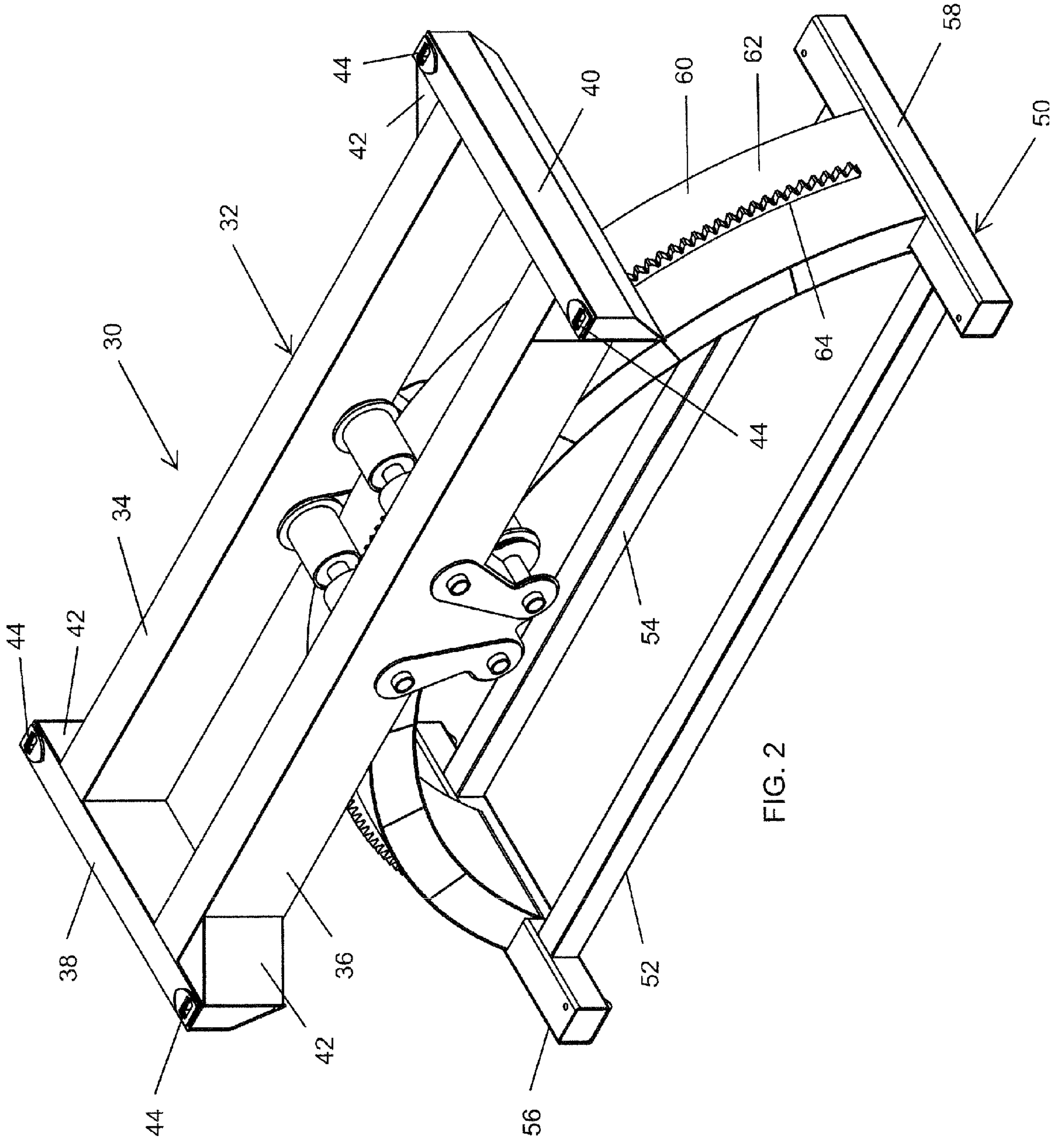
FIG. 2 is a top perspective second embodiment of a container tipping apparatus in accordance with the principles of the present invention.

As shown in FIG. 2, a slave spreader 30 in accordance with the principles of the present invention is illustrated. The slave spreader 30 is comprised of a first, upper support structure 32 generally in the form of a rectangular frame. The upper support structure 32 includes a pair of main beams 34 and 36 that span the length of the support structure 32. Transverse beams 38 and 40 form the ends of the support structure 32 and are attached to the ends of the main beams 34 and 36. The end beams 38 and 40 have a width that is greater than the spacing of the two main beams 34 and 36. A plurality of triangular members 42 are welded in the corners formed between the main beams 34 and 36 and the end beams 38 and 40 to add lateral stability to the upper support structure 32. Apertures 44 are provided in the end beams 38 and 40 proximate to their ends for receiving and connecting to twist lock connectors of the container lifting and transfer device, such as the reach stacker 10 shown in FIG. 1.

A second lower support structure 50 is configured to be releasably mounted to an intermodal container, such as the intermodal container 18 shown in FIG. 1. The lower support structure 50 is also in the general configuration of a box-type frame assembly with two spaced apart main beams 52 and 54 and two transversely extending end beams 56 and 58 attached to the ends of the main beams 52 and 54. An arcuate member or beam 60 is attached between the two end beams 56 and 58. The arcuate beam 60 defines an arc-shaped top surface 62 to which a gear rack 64 is attached. The gear rack 64 has a plurality of gear teach that extend along a length of the arcuate beam 60 between the first and second ends of the arcuate beam 60. The arcuate beam 60 is movably coupled to the upper support structure 32 with the relative movement being controlled by a pinion gear coupled to a motor (as described below) that engages with the rack gear 64 to cause lateral movement of the arcuate beam 60 relative to the upper support structure. As such, rotational movement of the pinion gear causes lateral movement of the arcuate beam relative to the upper support structure 32 and rotational movement of the lower support structure 50 relative to the upper support structure 32.

Figure 3:
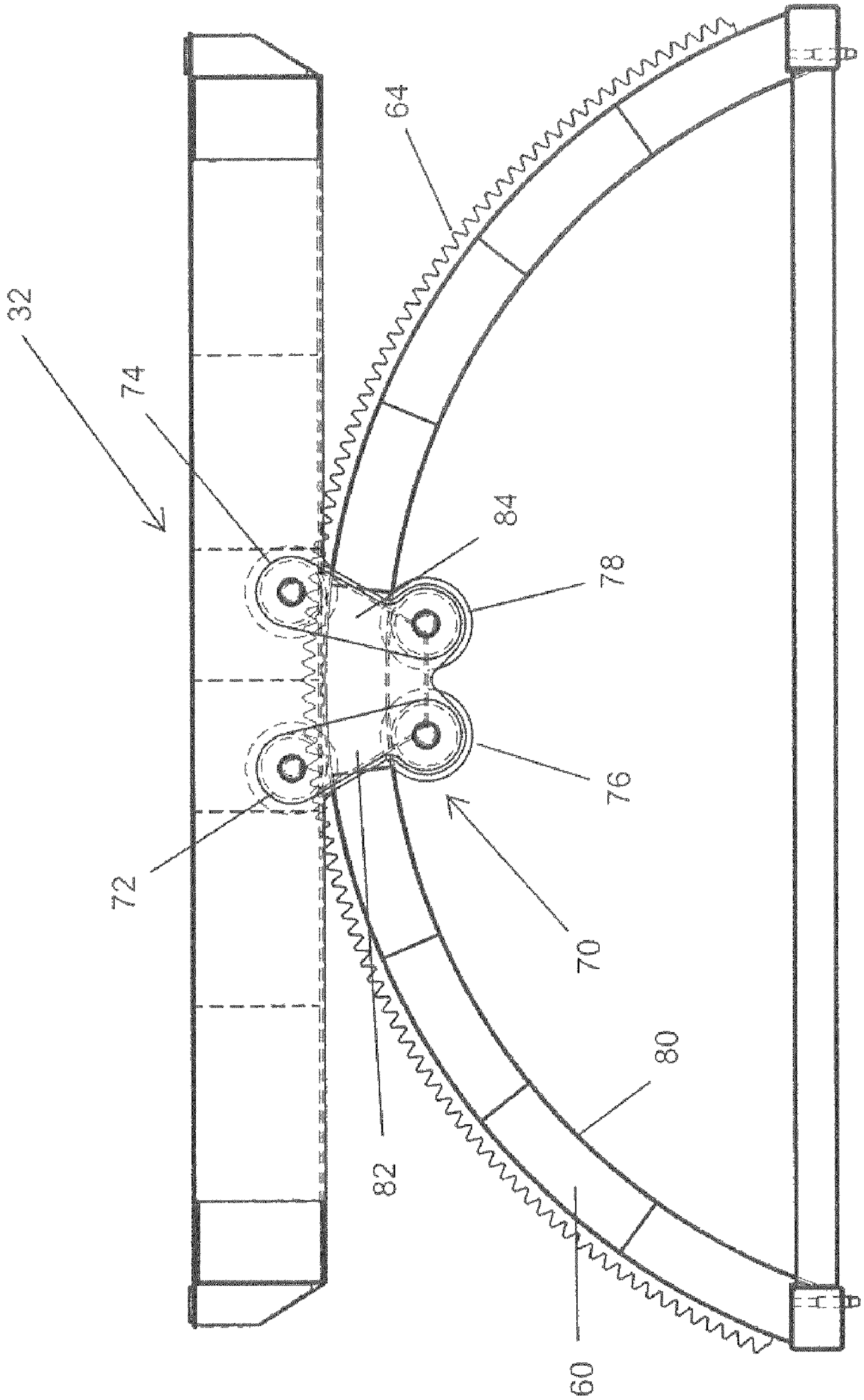
FIG. 3 is a side plan view of the container tipping apparatus illustrated in FIG. 2.

As further illustrated in FIG. 3, the upper support structure includes a roller assembly 70 that includes a pair of upper rollers 72 and 74 and a pair of lower rollers 76 and 78. The rollers 72-78 are idle rollers in that they can freely rotate about their axles. The upper rollers 72 and 74 roll along the top surface 62 of the arcuate beam 60 and the lower rollers 76 and 78 roll along the bottom surface 80 of the of the arcuate beam 60. Thus, the arcuate beam 60 is interposed between and retained by the upper and lower rollers 72-78. The roller assembly 70 supports the arcuate beam 60 as it moves relative to the upper support structure 32. The rollers may be configured with bushings or bearings to allow rotation of the rollers relative to their respective axles. For example, railroad car wheel bearings may be employed for the roller assemblies.

In order to ensure adequate support for the upper and lower rollers and to help maintain their vertical spacing, roller mount reinforcing and supporting plates 82 and 84 (only two of which are visible) are provided on the outside surface of the beam 36, as shown in FIG. 2. The plates may be heat treated steel plates to increase their strength and are provided to more evenly distribute the loads of the four rollers 72-78.

Figure 4:
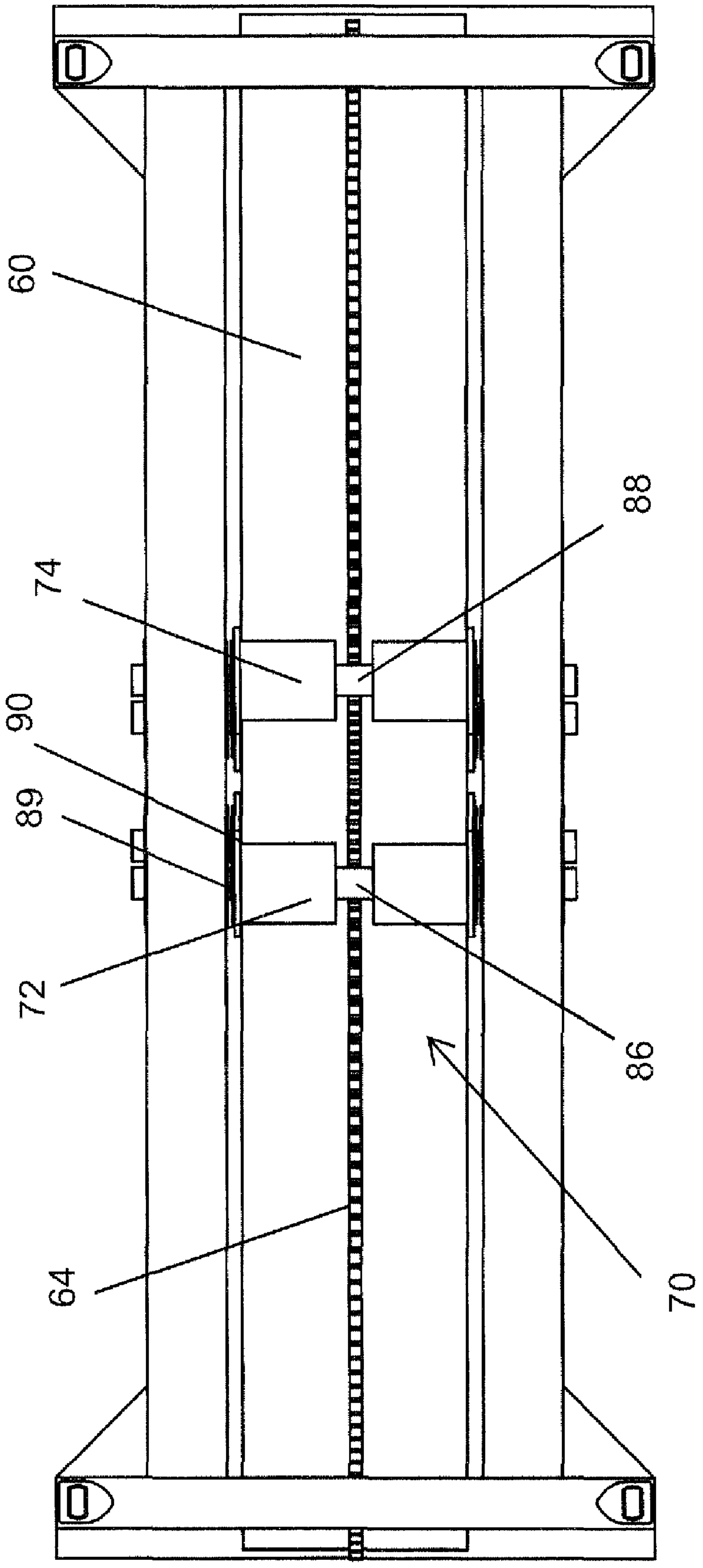
FIG. 4 is a top plan view of the container tipping apparatus illustrated in FIGS. 2 and 3.

As shown in FIG. 4, the upper rollers 72 and 74 have a width that is approximately the width of the arcuate beam 60. The upper rollers 72 and 74 are provided with central slots 86 and 88, respectively, that have a smaller diameter than the rollers 72 and 74 to allow passage of the arc-shaped rack gear 64 through the rollers 72 and 74. Each roller 72-78 is also provided with an outer beam guide 89 that is a disc-shaped member coupled to the outside edge 90 of the rollers. The guides 89 maintain the arcuate beam 60 in relative position to the roller assembly 70 as the arcuate beam 60 moves relative to the roller assembly 70 during a tipping operation.

Figure 5:
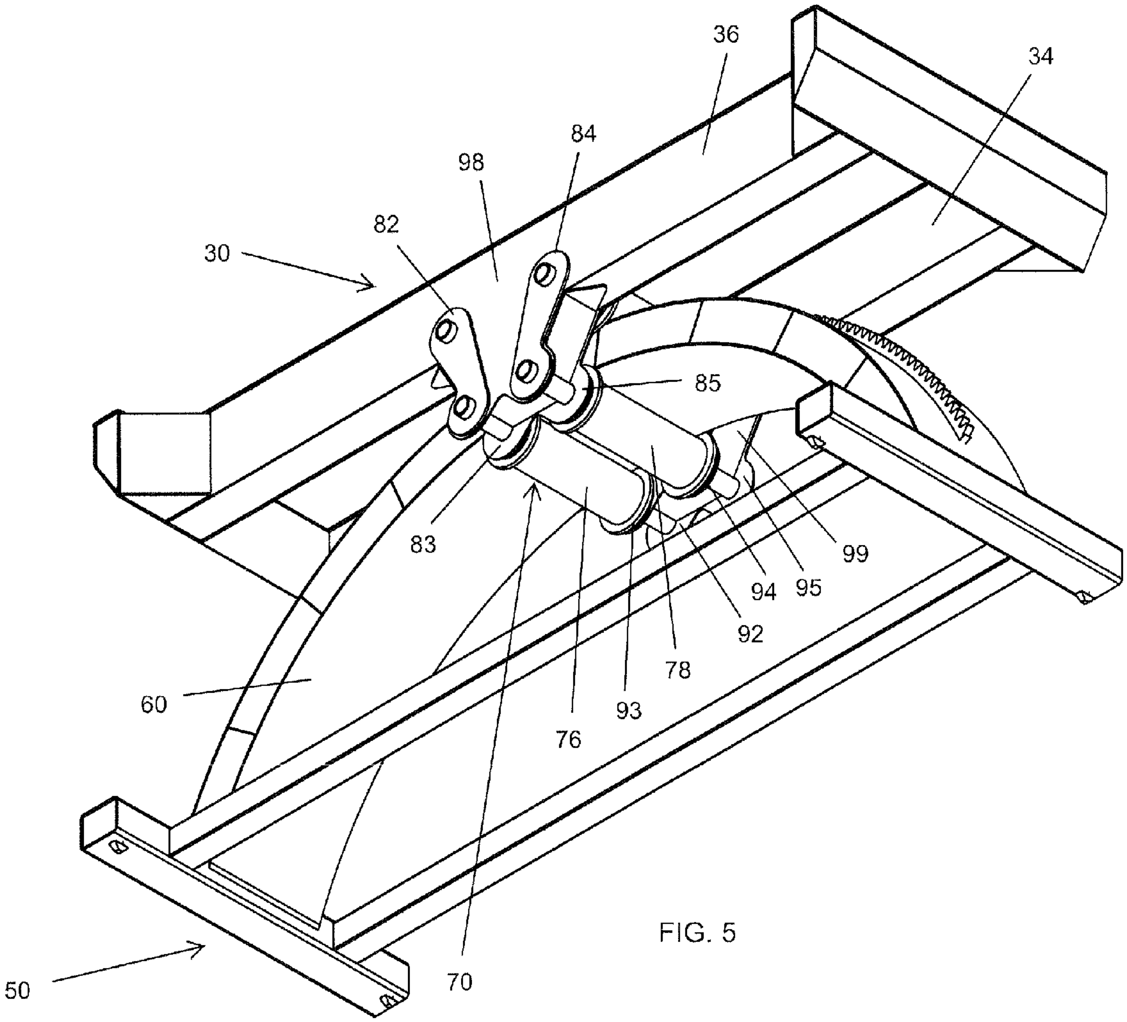
FIG. 5 is a bottom perspective view of the container tipping apparatus illustrated in FIGS. 2, 3 and 4.

FIG. 5 is a bottom view of the slave spreader 30 showing the bottom rollers 76 and 78. The bottom rollers are supported by the inside and outside support plates 82-85 and 92-95. The plates 82-85 and 92-95 are attached to and supported by the upper support beams 34 and 36 at a central trapezoidally-shaped portions 98 and 99 that depends from the bottom of the beams 34 and 36, respectively. It should be noted that the lower rollers 76 and 78 must support the entire weight of the lower support structure 50 and any container and corresponding cargo that is attached to the support structure 50.

It should be noted that while the slave spreader 30 is illustrated as having a roller assembly 70 comprised of two upper rollers 72 and 74 and two lower rollers 76 and 78, the roller assembly may be comprised of additional rollers arranged in an arc to provide additional support for a load carried by the slave spreader. That is, it may be desirable to provide multiple lower rollers that would add additional weight carrying capacity and to prevent the lower support structure 50 from rotating to a position such that the arcuate beam 60 maintains a substantially tangentially oriented configuration relative to the upper support structure at the roller assembly 70 as it moves relative to the roller assembly 70.

Figure 6:
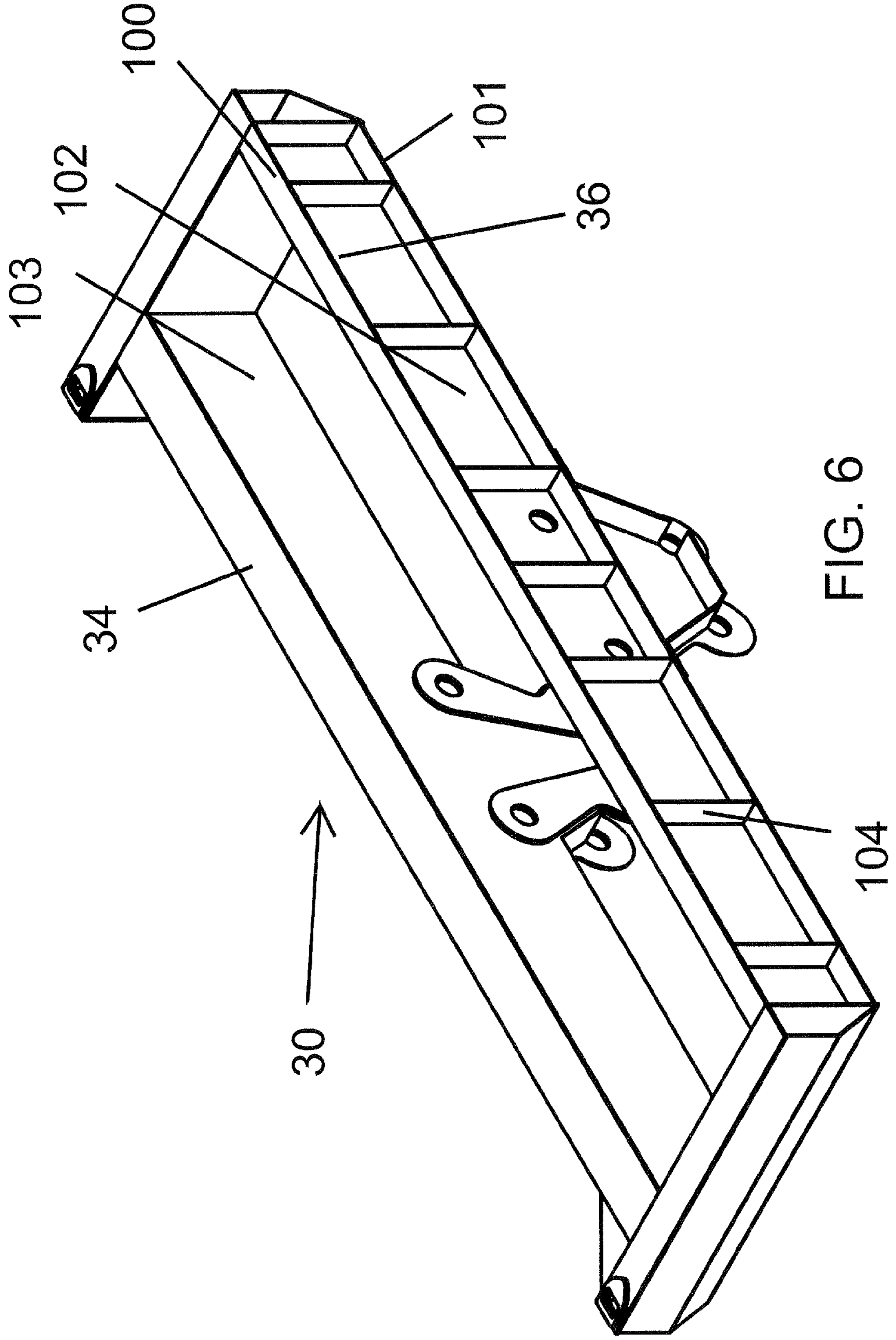
FIG. 6 is a top perspective view of a portion of the container tipping apparatus illustrated in FIGS. 2, 3, 4 and 5.

As shown in FIG. 6, the upper support structure 32 is comprised of a box-beam structure in which the beams, such as beams 34 and 36, are comprised of four walls (top, bottom, left side, right side) 100, 101, 102, and 103 and further include intermediate internal walls 104 that are vertically oriented and spaced along the beams 34 and 36. The internal walls 104 are positioned within the beams 34 and 36 to provide additional structural integrity and strength to the beams 34 and 36 to support any associated loads. The beams 34 and 36 as well as the other structures forming the upper support structure 32 are comprised of steel. In the case of the beams 34 and 36, the beam assemblies are welded together to form each beams 34 and 36 which are in turn welded to the other components of the upper support structure 32. Of course, while the beams 34 and 36 are described as having a particular configuration, beams of other configurations and cross-sections sufficient to support the load may be employed.

Figure 7:
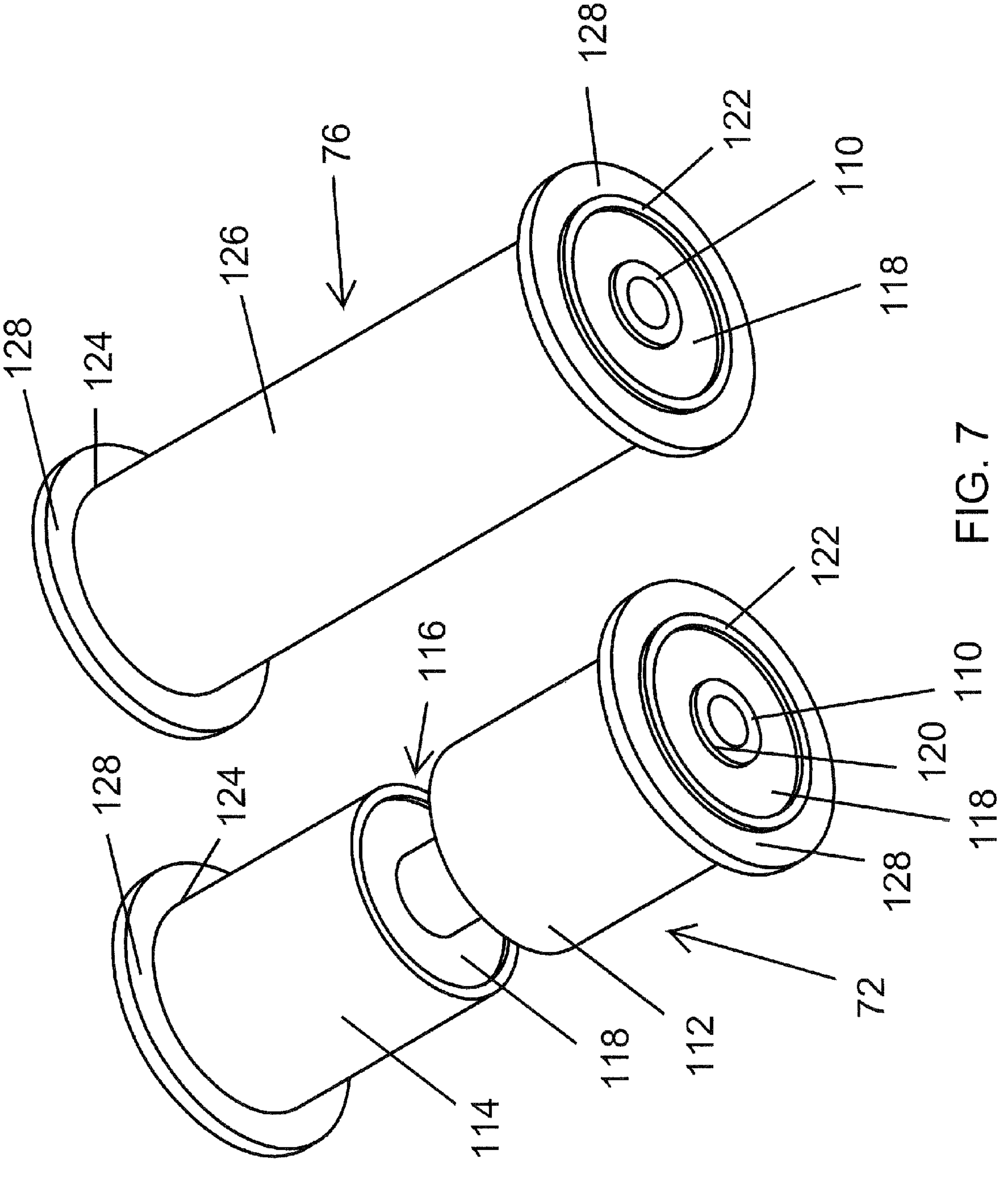
FIG. 7 is a side perspective view of the upper and lower rollers of the container tipping apparatus illustrated in FIGS. 2, 3 and 4.

FIG. 7 illustrates upper and lower rollers 72 and 76 that are incorporated into the roller assembly 70. The upper and lower rollers 72 and 76 include a center hollow shaft 110 that extends along the length of each roller 72 and 76. In the case of upper roller 72, roller sleeves 112 and 114 are attached to the shaft 110. The roller sleeves 112 and 114 are spaced apart at the center of the roller 72 to form a gap 116 therein between, The gap 116 is provided to allow passage of the arcuate rack gear attached to the arcuate beam as previously discussed. The sleeves 112 and 114 are attached to the shaft 110 with doughnut shaped disc members 118 that have a diameter that is approximately the size of the inner diameter of the roller sleeves 112 and 114 and include a central aperture 120 that is sized to receive the shaft 110. Proximate the distal and proximal ends 122 and 124 of the roller sleeves 112 and 114 and roller sleeve 126, are provided guide members 128 for maintaining the relative position of the arcuate beam (as previously discussed), relative to the rollers 72 and 74. The guide members 128 have are disc shaped and have a diameter that is greater than the diameter of the roller sleeves 112, 114 and 126. Thus, the guide members 128 provide an abutment with the actuate beam disposed between guide members 128 of the rollers 72 and 76.

Figure 8A:
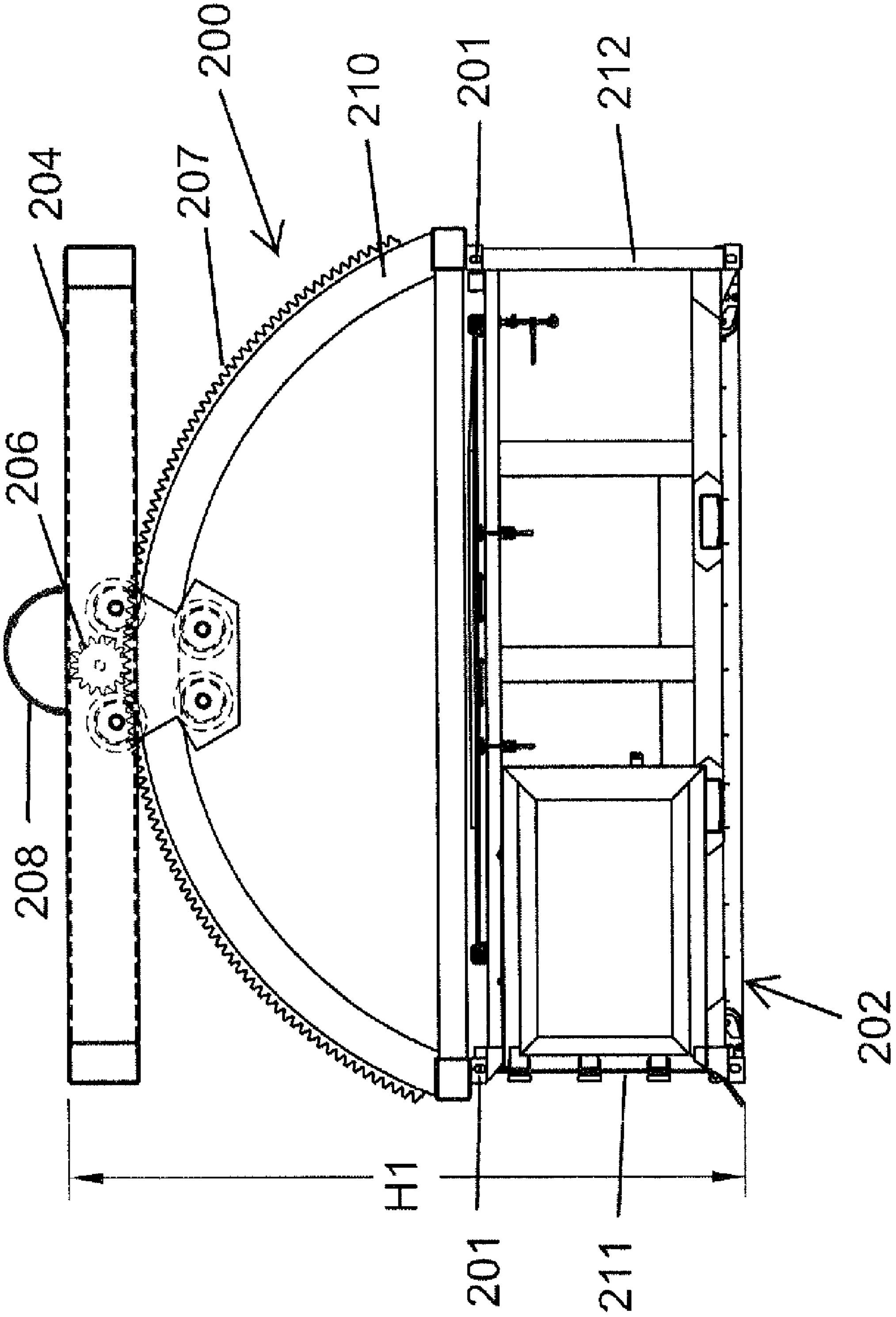
FIGS. 8A, 8B, 8C and 8D are side plan views of a third embodiment of a container tipping apparatus in accordance with the principles of the present invention illustrating various tipping positions of a container attached thereto.
Figure 8B:
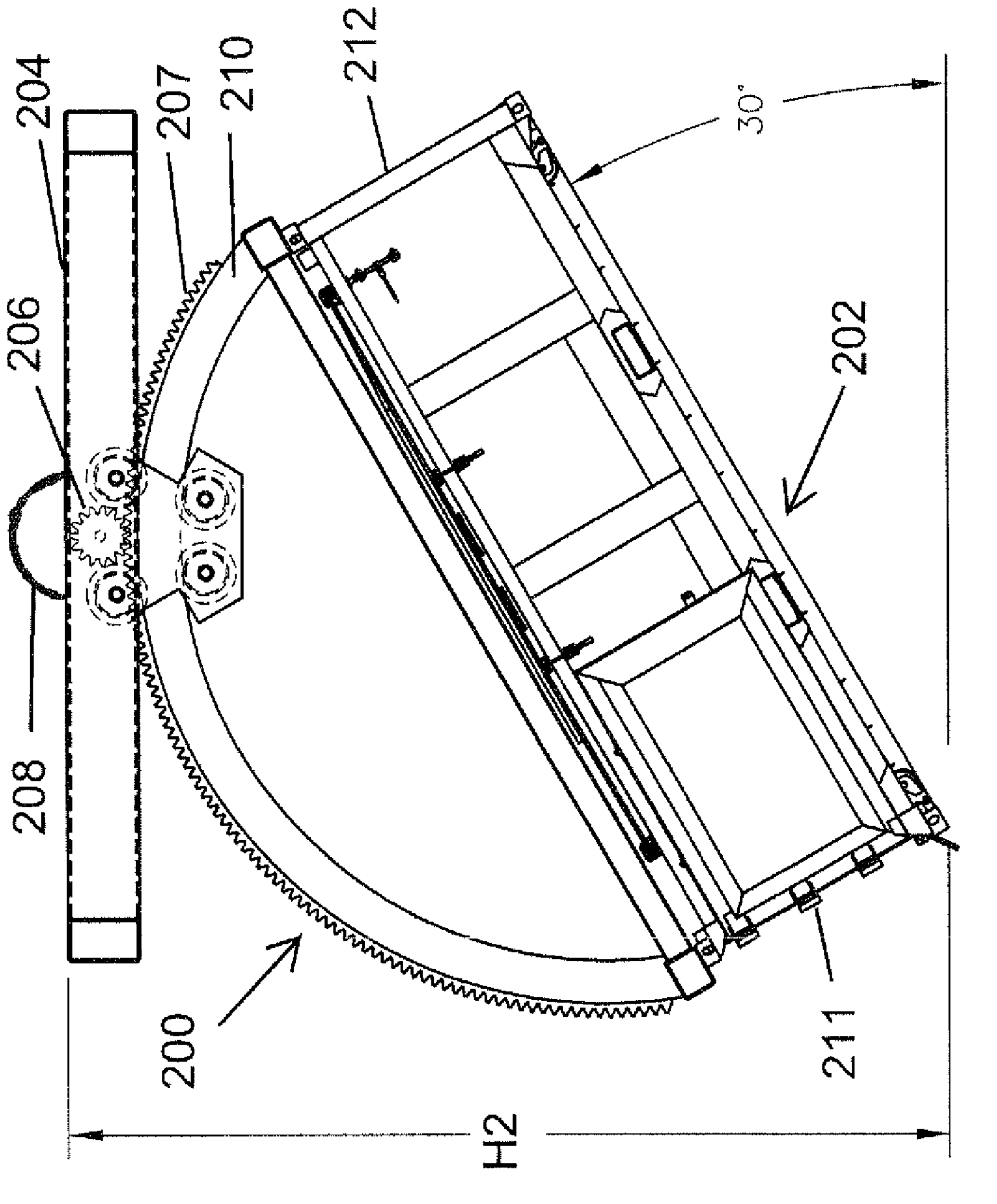
Figure 8C:
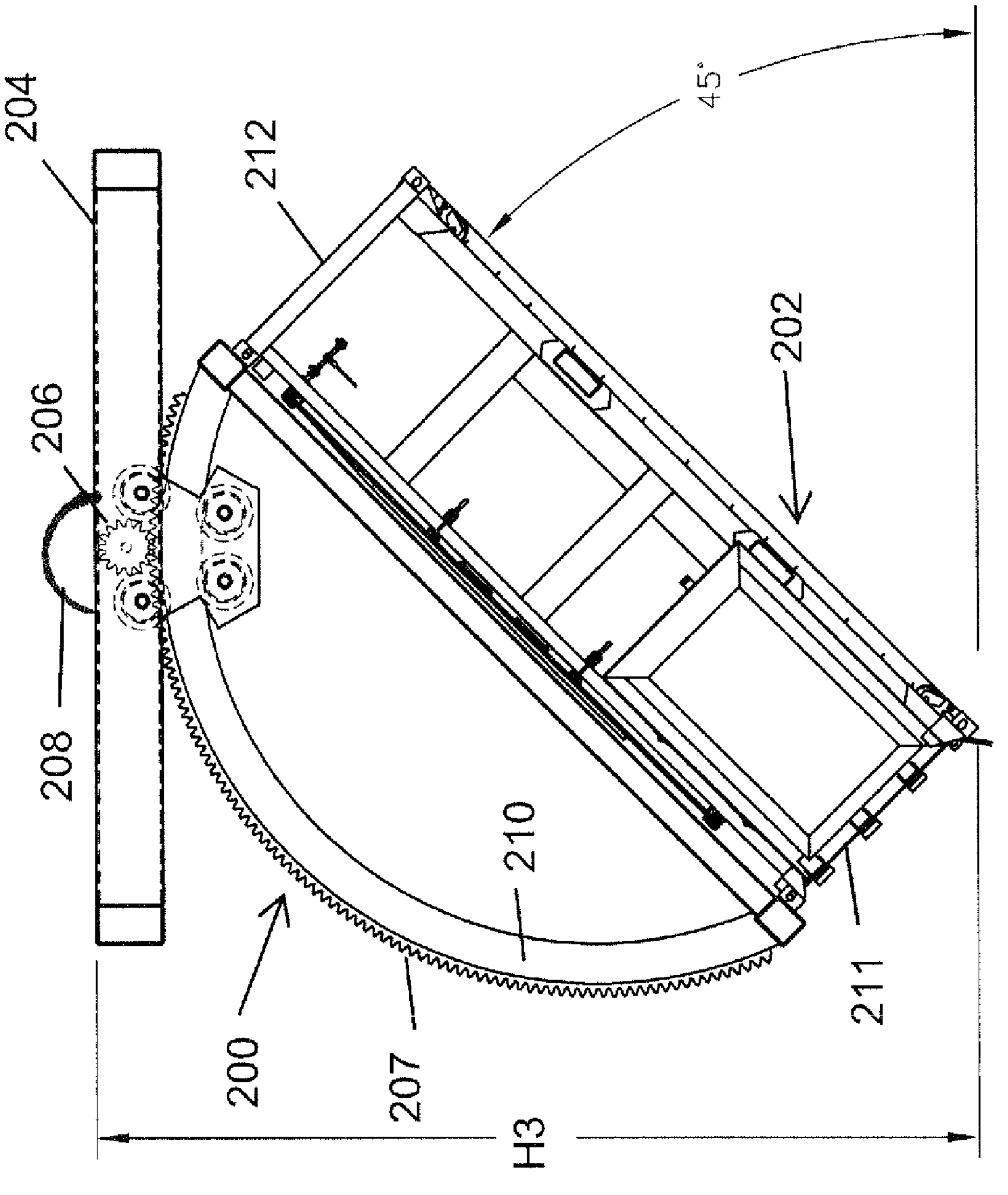
Figure 8D:
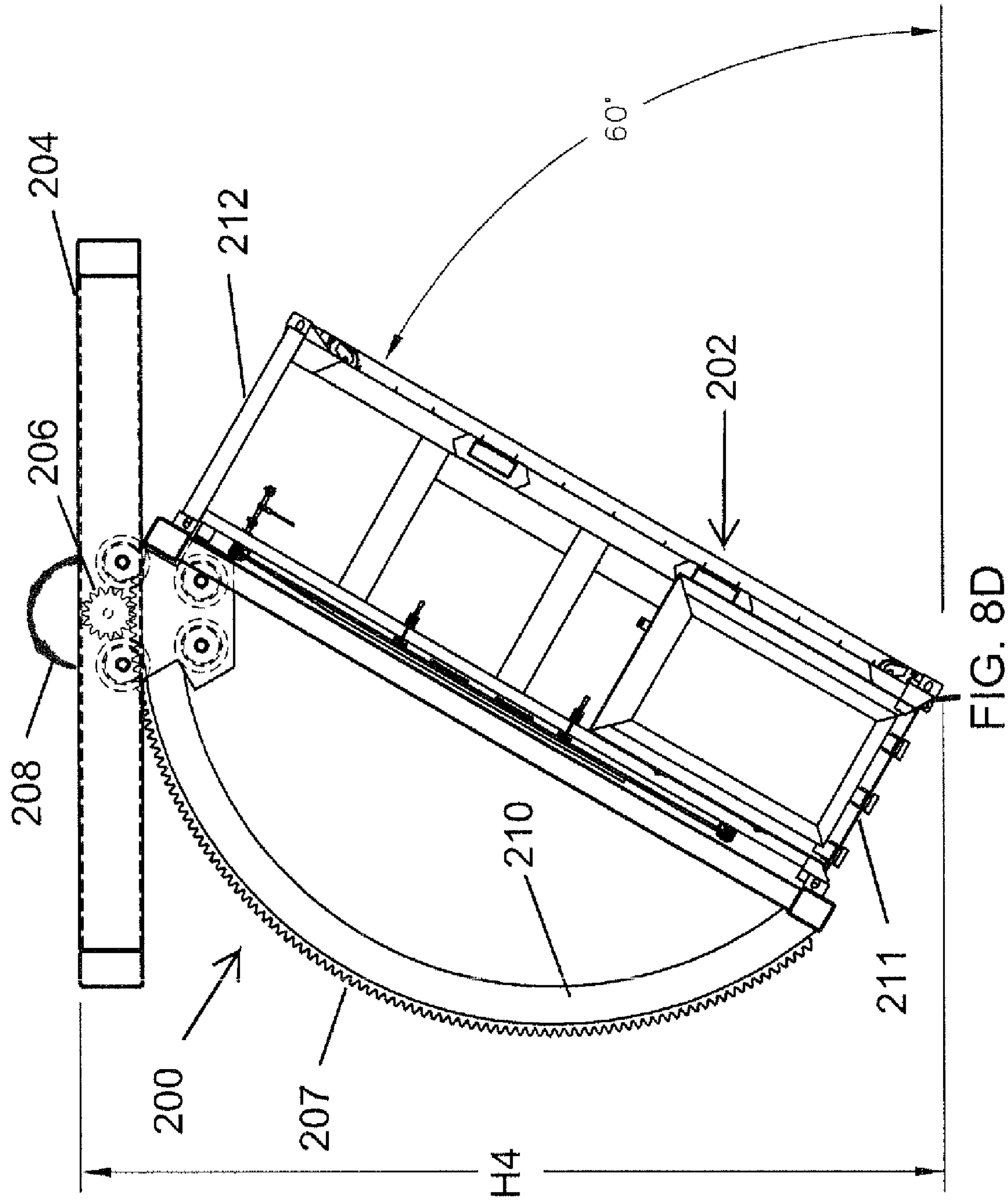

FIGS. 8A-8D, illustrate a tipping slave spreader, generally indicated at 200 in accordance with the principles of the present invention, in four positions of a tipping operation. As shown in FIG. 8A, the slave spreader 200 is coupled to a container 202 in a neutral or horizontal position. The container 202 is coupled to the slave spreader 200 with twist locks 201 that are controlled by a user of the slave spreader 200. The overall height H1 of the combined slave spreader 200 and container 202 is approximately 16 feet and will increase as the container 202 is rotated relative to the upper support structure 204 to approximately 23 feet when rotated to its maximum tipping position as shown in FIG. 8D. Thus, as shown in FIG. 8B, when the container has been tipped to about 30 degrees from the horizontal, the combined height H2 of the slave spreader 200 and container 202 is approximately 20 feet. In FIG. 5C, when the container 202 has been tipped approximately 45 degrees from the horizontal, the combined height H3 is approximately 22 feet and when the container has been tipped to approximately 60 degrees from the horizontal, the total combined height H4 is about 23 feet. Thus, from a first horizontal position to a position of maximum tipping, such as 60 degrees as shown in FIG. 8D, the overall height of the slave spreader 200 and container 202 only increases approximately seven feet. This change in height is comparable to other tipping devices known in the art as the container is rotated or tipped relative to the upper support structure 204. While the present embodiment has been described with reference to particular dimensions for a particular container/slave spreader 200, it is understood that the principles of the present invention and sizes related to specific embodiments herein may be applied to other sizes of spreaders for other containers known in the art.

As further illustrated in FIGS. 8A to 8D, the tipping operation is actuated by the engagement of a pinion gear 206 that engages arcuate rack gear 207. The pinion gear 206 is driven by motor 208 to selectively and controllably rotate the rack gear 206 to move the rack gear 207 relative thereto and thus control the position of the arcuate beam 210 relative to the upper support structure 204. Thus, the slave spreader 200 is capable of tipping a container 202 in two directions. As such, the container 202 may be tipped such that a first end 211 is positioned lower than a second end 212 as illustrated or in an opposite direction such that the second end 212 is positioned lower than the first end 211 when tipping. Thus, the motor 208 is capable of controlling rotation of the rack gear 206 in both directions of rotation and may comprise an electric or hydraulic motor combined with a speed reducer or a stepper motor to allow precise control of rotation.

Depending on the weight of the load, the torque requirements for a container tipping apparatus in accordance with the present invention will vary. The container tipping apparatus is configured to handle such torque requirements. Because the operation of the tipping apparatus of the present invention results in small changes in the position of the center of gravity during a tipping operation, the torque requirements are reduced as compared to tipping operations using conventional machinery. As such, when the container tipping apparatus is attached to a loaded container, the center of gravity of the load remains relatively stable during the entire tipping operation.

As the container is tipped and the load within the container begins to exit the container, the motor controlling the tipping action may be forced to over rotate the tipping apparatus. As such, the motor may be provided with a braking mechanism that can be applied to slow the rate of rotation of the tipping apparatus as desired. One way to provide a brake for the motor is with the use of a counterbalance valve. The counterbalance valve is coupled to the motor to provide a controllable braking to the motor to prevent over rotation of the motor as the torque requirements on the motor are reduced during the tipping operation.

Figure 9A:
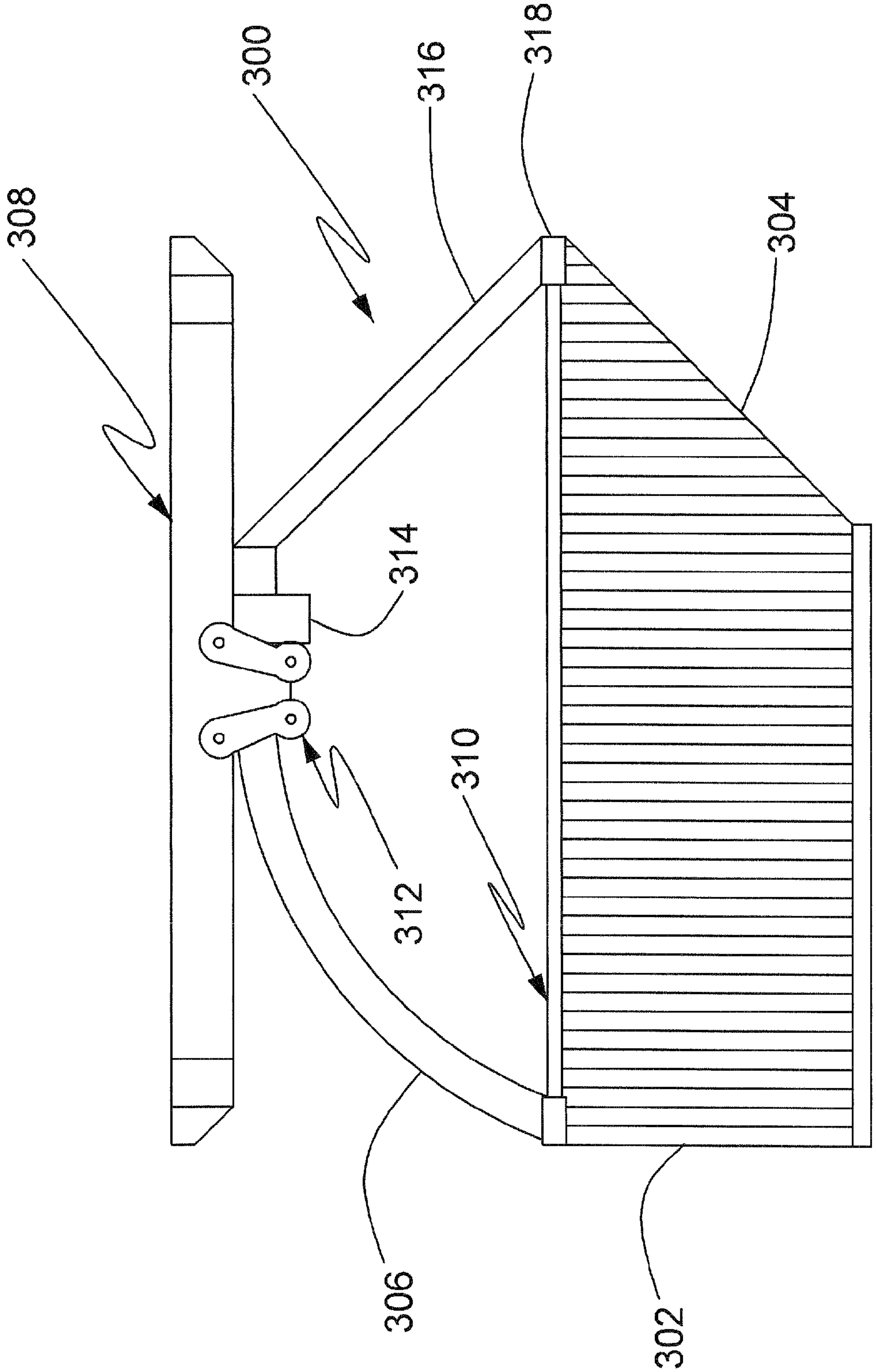
FIG. 9A is a side plan view of a fourth embodiment of a container tipping apparatus in accordance with the principles of the present invention with a container attached thereto.
Figure 9B:
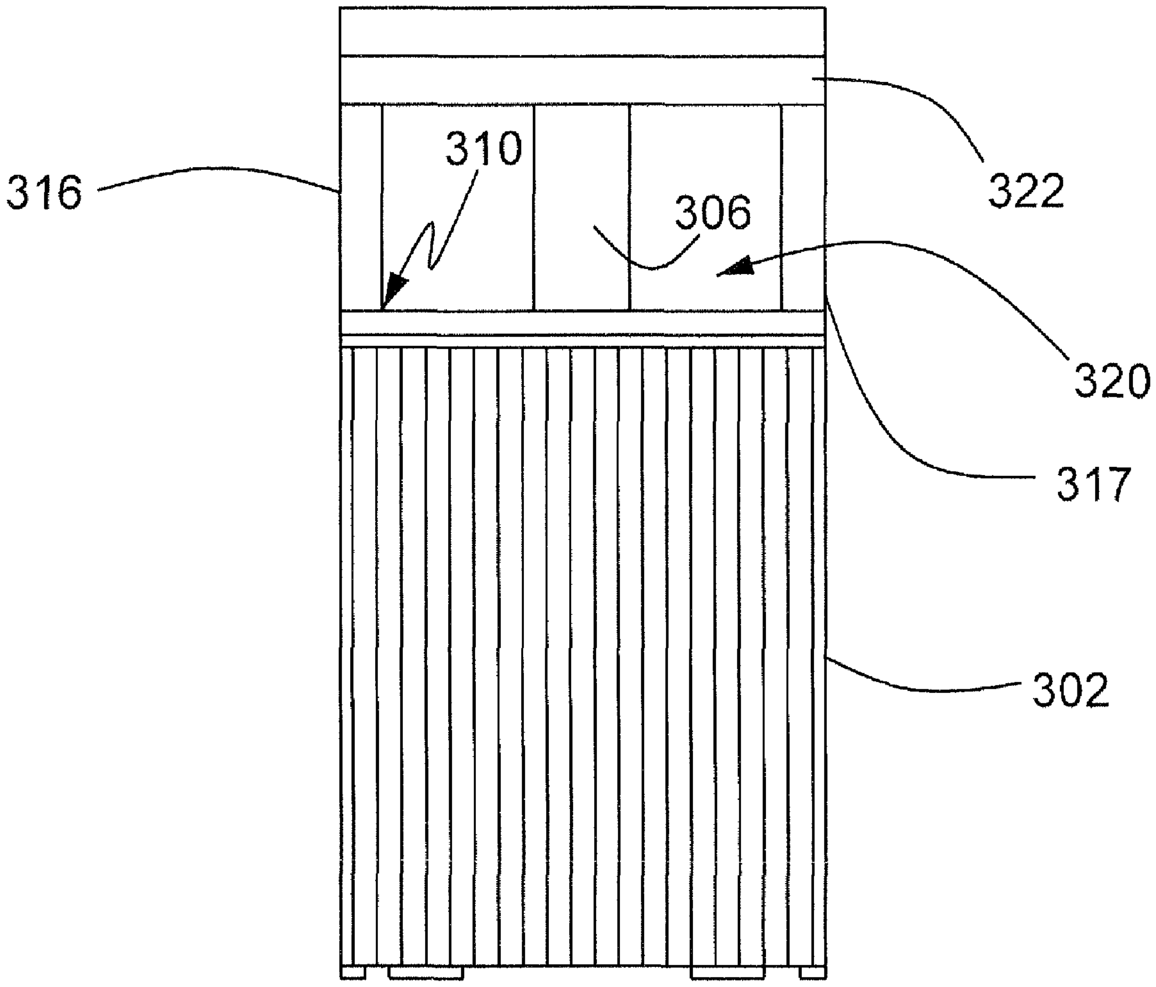
FIG. 9B is a front plan view of the container tipping apparatus and container illustrated in FIG. 9A.
Figure 9C:
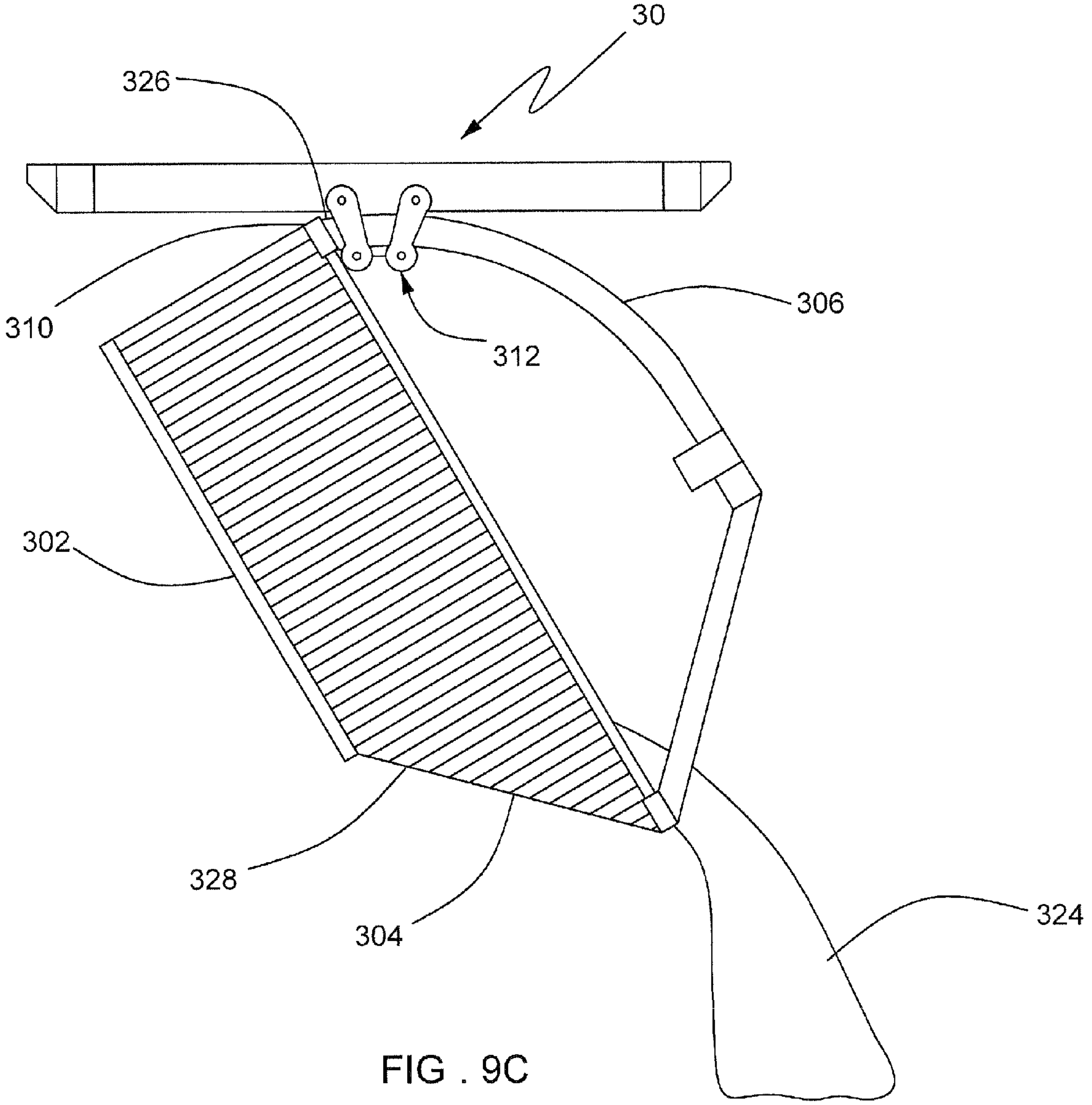
FIG. 9C is a side plan view of the container tipping apparatus and container illustrated in FIGS. 9A and 9B in a dumping or fully tipped position showing material contained in the container being dumped therefrom.

FIGS. 9A, 9B and 9C illustrate another embodiment of a container tipping apparatus, generally indicated at 300, in accordance with the principles of the present invention. The tipping apparatus 300 is configured to attach to and tip a container 302 having a configuration in which one end 304 is sloped to allow dumping of material contained within the container 302 from the end 304. The tipping apparatus 300 is comprised of an arcuate beam 306 suspended from an upper support structure 308. The upper support structure 308 is configured similarly to other similar structures described herein. The arcuate beam 306 extends from the lower support structure 310 configured to mate with and support the container 302 to the upper support structure 308 and more particularly to the roller assembly 312. An abutment member 314 is provided adjacent the roller assembly 312 to prevent the actuate beam 306 from moving past a point where the container is in a neutral or substantially horizontal position. Thus, the arcuate beam 306 is semicircular in configuration and, in the embodiment shown in FIG. 9A extends approximately 90 to 75 degrees of a complete circle. Coupled to arcuate beam 306 at the opposite side of the roller assembly 312 are angled support members 316 that attach the top end of the arcuate beam 306 to the dumping end 318 of the lower support structure 310.

As shown in FIG. 9B, the angled support members 316 and 317 are spaced apart and define an opening 320 through which material contained within the container can be dumped when tipped. That is, there is no obstruction between the upper support beam 322 and the lower support structure 310 to allow material contained within the container to flow there through. Thus, as with previous embodiments disclosed herein, the arcuate beam 306 supports the container 302 during the entire tipping operation.

As further illustrated in FIG. 9C, the container tipping apparatus is shown in a dumping position in which the material 324 is being dumped from the container 302. To do so, the pinion gear (not visible) drives the actuate member 306 until the roller assembly 312 is positioned proximate the distal end 326 of the arcuate member 306 where it joins the lower support structure 310. When in this position, the material 324 can slide out of the container 302 along the sloped surface 328 along the end 304 of the container 302.

Referring again to FIG. 1, the intermodal container 18 is attached to the tipping apparatus 20 of the present invention and the tipping operation and dumping of the intermodal container 18 employing the tipping apparatus 20 is controlled by an operator of the reach stacker 10 or other lifting apparatus. Such containers 18 typically includes connecting apertures on the top thereof arranged to be engaged by twist locks 21 attached to the lower support assembly 23 of the tipping apparatus 20. The twist locks 21 are controlled through pneumatic, hydraulic or electric actuation selectively controllable by the operator. There are four such twist locks 21, one positioned at each corner of the container 18. The container is provided with a door 25 that can be selectively opened by the operator. The door 25 is mounted at the top by hinge 27, such that the door 25 can pivot open for dumping the contents of container 18. The door 25 is held in a closed position by clamping devices 29 that are arranged along the sides of the door 25 and pivot on hinges in response to activation of pneumatic cylinders or other similar devices, such as hydraulic cylinders or electrical solenoids, that retract levers holding the door 25 in a closed position. As the container 18 is being tilted to empty the contents thereof, the operator of the reach stacker 10 or other device can release the door 25 at the appropriate time by activating the clamping devices 29 to release the door 25 and allow the door 25 supplying air to pivot about the hinge 27. As such, the door 25 will automatically open at the desired time by selective actuation by the operator during a tipping operation. The door 25 can then be automatically relocked after the container is emptied by reverse actuation controlled by the operator.

The tipping apparatus 20 is coupled to the primary spreader 31 with twist locks 33 similar in configuration to the twist locks 21 that attach the tipping apparatus 20 to the container. In essence, the tipping apparatus 20 is a secondary spreader interposed between the primary spreader 31 and the container 20 and is provided with apertures in the upper support structure for being engaged by the twist locks 33 of the primary spreader and twist locks 21 for engaging apertures in the container 18. This allows the tipping apparatus 20 to function with preexisting machinery and containers without the need for structural modification thereto.

It will be appreciated by those skilled in the art that the apparatus of the invention can be operated by a single operator from the cab of the reach stacker 10. Various pneumatic cables 37 connected to the various operating parts of the apparatus are controlled by the operator of the reach stacker 10. In addition to the various controls provided in such reach stackers as they may be currently configured, controls for operating the tipping apparatus 20 of the present invention are also included. Such controls include operation of the motor that controls the tipping operation of the tipping apparatus 20 and actuation of the twist lock devices 21 that couple to and release the container 18 therefrom. The controls may be hard wired controls between the tipping apparatus 20 and the cab of the reach stacker 10 or may comprise remotely operated controls that employ wireless communication. These operating parts and the lift and drive of reach stacker 10 can accordingly be operated from the cab and enable a single operator to engage a container, lift and position it in a place where it is to be emptied, tilt the container 18 while unlocking the door clamp to empty the container, transport the container to an empty container area and release the container from the tipping apparatus 20.

Those skilled in the art will understand that the operating parts of the present invention may be pneumatically, hydraulically or electrically operated or a combination thereof. The only connections that may need to be made between the tipping apparatus of the present invention and the reach stacker 10 are pneumatic and electrical connections for operating the motor that drives the pinion gear and pneumatic connections for operating the twist locks that attach the tipping apparatus 20 to the container.

Figure 10:
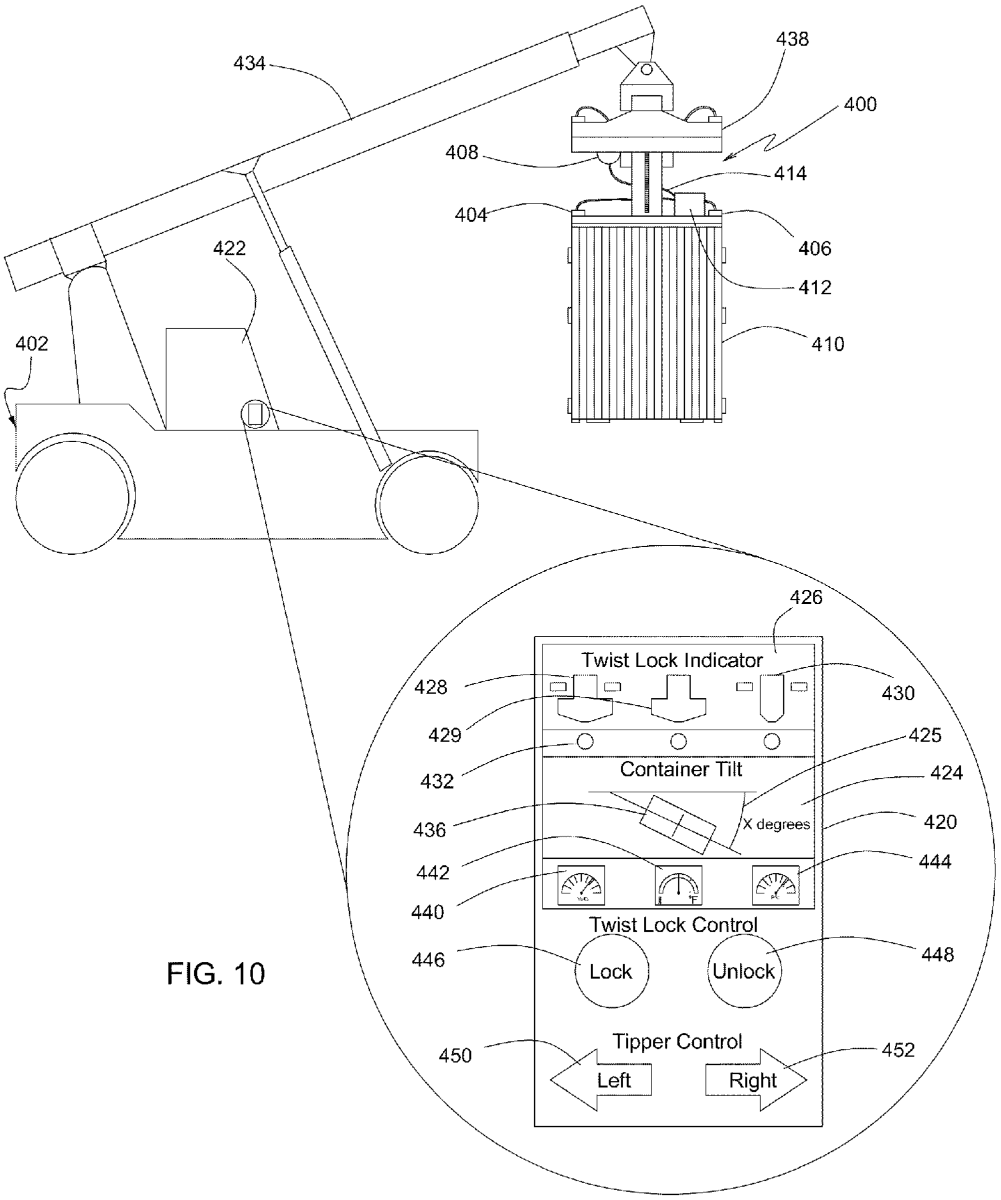
FIG. 10 is a side view of a fifth embodiment of a container tipping apparatus according to the principles of the present invention and associated control system.

As shown in FIG. 10, a tipping apparatus 400 according to the present invention may be completely self contained and remotely operable by the driver of the reach stacker 402. That is, the tipping apparatus 400 may provide its own power for actuating the twist locks 404 and 406 as well as for operating the motor 408 coupled to the rack gear (as previously described herein but not visible) for causing the tipping apparatus to tip an attached container 410. The tipping apparatus 400 is provided with an electronic power source/control system 412 that includes a battery or bank of batteries and electronic control and communications systems for wireless communication with the remote control unit. The electronic control system 412 is electrically coupled to the electric motor 408 and twist locks 404 and 406 for operating the electric motor 408 and for operating the twist locks 404 and 406. The twist locks 404 and 406 may be electronically driven such that each twist lock 404 and 406 are each actuated by electric impulse, as with a small electric motor or a solenoid. An electrical wiring harness 414 includes wiring for coupling the power source 412 to the twist locks 404 and 406 and to the electric motor 408.

Because the operational control systems of the tipping apparatus 400 are independent of the operational control systems of the reach stacker 402, a remote control unit 420 is provided for the driver of the reach stacker within the cab 422 of the reach stacker. The remote control unit includes an LCD screen 424 for displaying certain operating parameters of the tipping apparatus 400. Thus, by way of example, the LCD screen 424 may display a Twist Lock Indicator 426 which shows the status of the twist locks 404 and 406 in a closed and locked position 428, a closed but unlocked position 429 or a landed position 430. Each twist lock position is accompanied by a status light 432 which corresponds to the various twist lock positions to indicate the status the twist locks 404 and 406. The twist locks 404 and 406 are provided with sensors to detect the position of the twist lock (open or closed) and the engagement of each twist lock to the container 410. Thus, each twist lock is protected individually against unwanted rotation and electrical signals from all land pins of the twist locks indicate that all twist locks have landed properly. In such a state, the closed and locked indicator light 432 would be illuminated.

The lights 432 will flash if any sensor of any twist lock 404 and 406 detects that an error condition is present. For example, if all of the twist locks are not in the same state, an error state would occur. Thus, if only two of the four twist locks are in a locked position and error state would occur to prevent lifting of the container.

The remote 420 is in wireless communication with the tipping apparatus 400, and more specifically with the control system 412, to remotely control the operation of the tipping apparatus 400 as well as to receive operational status information for displaying on the LCD screen. Thus, the remote 420 includes a transceiver for two-way communication with the control system 412 for sending control signals and for receiving operational data to display the operational status of the tipping apparatus 400. Likewise, the control system 412 also includes a transceiver for receiving control signals from the remote 420 and for sending operational system data to the remote control 420 for displaying stem data on the LCD screen 424. In addition, the remote 420 may provide a signal either wireless or wired to the reach stacker (or other lifting device to which the tipping apparatus 400 is attached) so as to prevent or block the hoist function of the reach stacker 402 if the twist locks are not fully locked. Likewise, another signal may be generated to the reach stacker 402 to stop the downward movement of the boom 434 as soon as the tipping apparatus 400 has landed properly on the container 410. Also, with the twist locks 404 and 406 "landed" and/or "locked", the extension and retraction functions of the boom 434 are blocked.

The LCD screen 424 may also provide a graphical representation of the container 436 and its degrees of tilt relative to the spreader 438 of the reach stacker 402. As such, the operator can tip the container 410 to a predetermined tilt angle 425 sufficient to remove the contents of the container 410. In addition, a voltage meter 440, temperature gauge 442 and pressure gauge 444, as may be desired to display operating parameters of electrical and/or pneumatic systems may also be provided.

In addition, the control system 412 may include software or firmware and processing and storage hardware for counting and recording the number of tipping operations that have occurred with the tipping apparatus of the present invention. This information could be displayed on the LCD screen 424. The tipping count could also be transmitted or downloaded from the control system 412 on a periodic basis for billing purposes. That is, in a lease situation for the tipping apparatus, the lessee could be billed on a per tip basis, such that the control system records the number of tips that have occurred so that the lessor can properly bill the user.

The operation of the tipping apparatus 400 is controlled with the remote control unit 420. Thus, there are buttons 446 and 448 which lock and unlock the twist locks, respectively. Also, there are arrow-shaped buttons 450 and 452 to rotate the container 410 to the left or to the right, respectively. Of course, other buttons for operating other features may also be provided on the remote control unit 420 as desired. Accordingly, the tipping apparatus 400 of the present invention may be adapted to work with any preexisting lifting device, such as a reach stacker or a crane without the necessity of needing to modify any existing equipment. The remote control unit 420 can be mounted to the lifting device for use by the operator of such lifting device by any suitable means.

Figure 11:
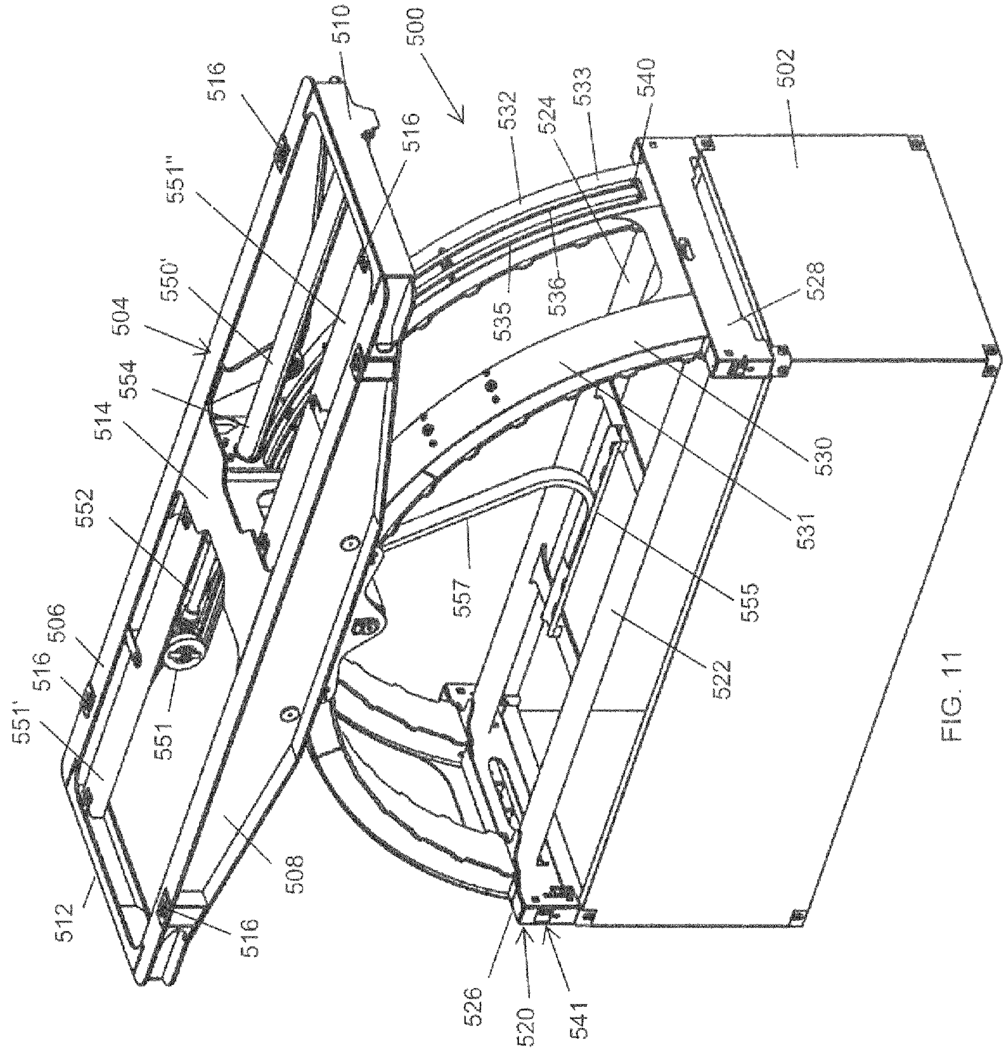
FIG. 11 is a perspective top side view of a sixth embodiment of a container tipping apparatus according to the principles of the present invention.

FIG. 11 illustrates another embodiment of a container tipping apparatus, generally indicated at 500 in accordance with the principles of the present invention, attached to an intermodal container 502. The tipping apparatus 500 is a self contained tipping apparatus comprised of an upper support structure 504 generally in the form of a rectangular frame. The upper support structure 504 includes a pair of main beams 506 and 508 that span the length of the support structure 504. Transverse beams 510 and 512 form the ends of the support structure 504 and are attached to the ends of the main beams 506 and 508. A cross-beam 514 is disposed between the beams 510 and 512 at about their midpoints such that the cross-beam 514 is disposed midway between the end beams 510 and 512. The end beams 510 and 512 have a width that is greater than the spacing of the two main beams 34 and 36, as shown in FIG. 2. Apertures 516 are provided in the beams 506 and 508 at a spacing that coincides with the spacing of twist locks that are provided on a conventional spreader to allow the spreader to selectively attach to and release from the tipping apparatus 500.

A second lower support structure 520 is configured to be selectively releasably mounted to an intermodal container, such as the intermodal container 502. The lower support structure 520 is also in the general configuration of a box-type frame assembly with two spaced apart main beams 522 and 524 and two transversely extending end beams 526 and 528 attached to the ends of the main beams 522 and 524. A pair of arcuate members or beams 530 and 532 is attached between the two end beams 526 and 528.

The upper support structure 504 includes a pair of linear actuators, such as actuator 550', which may be in the form of a hydraulic or pneumatic cylinder or ram. Each actuator 550' is coupled between a respective end beam 510 or 512 and the center cross-beam 514. Freely rotatable chain sprockets or pulleys 551 are coupled to the free end of the piston rod 552. The body 554 of the actuator 550' is attached between the end beam 510 and the cross-beam with the free end of the piston rod 552 extendable from the cross-beam toward the opposite end beam 512 in a controllable manner. The actuators 550' are provided with supply reservoirs 551' and 551" attached to the upper support structure 504 so that the actuators 550' need not be coupled to an external fluid source, such as a hydraulic fluid line or air hose, in the case of a pneumatic system.

The arcuate beams 530 and 532 define arc-shaped top surfaces 531 and 533, respectively, upon which chains, such as chains 535 and 536 reside. A pair of similar chains resides on the surface 531 along the opposite side of the arcuate beam closest to the end beam 526 and a similar, but oppositely oriented actuator is attached to the upper support structure 510 to cooperate with the chains on surface 531.

The chains 535 and 536 are attached at one end to a chain attachment bracket 540 that is fixedly attached to the arcuate beam 532 near one end thereof. The chains 535 and 536 lie on top of the beam 532 and extend around the sprockets or pulleys 551. At least one of the chains 535 and 536 passes through the cross-beam and attaches at an opposite end to inside of the end beam 510. One or both of the chains may also be attached at their opposite ends to the cross-beam 514. As the piston rod 552 extends from the cylinder body 554, the arcuate beam 532 is pulled relative to the cross-beam 514 with the chains 535 and 536 which causes rotational movement of the lower support structure 520 and thus the container 502 in order to tip the container 502. As will be described in more detail, extension of the second piston rod (not visible) and retraction of the piston rod 552 relative to the cylinder housing 554 causes translation of the arcuate beams 530 and 532 in the opposite direction. A control line support rack 555 is provided between the beams 522 and 524 of the lower support structure 520 to which electrical, hydraulic or pneumatic lines 557 are attached and supported during movement of the upper support structure 504 relative to the lower support structure 520. The lines 557 are coupled to the twist lock assemblies 541 of the lower support structure in order to provide remote control of the twist locks 541.

Figure 12:
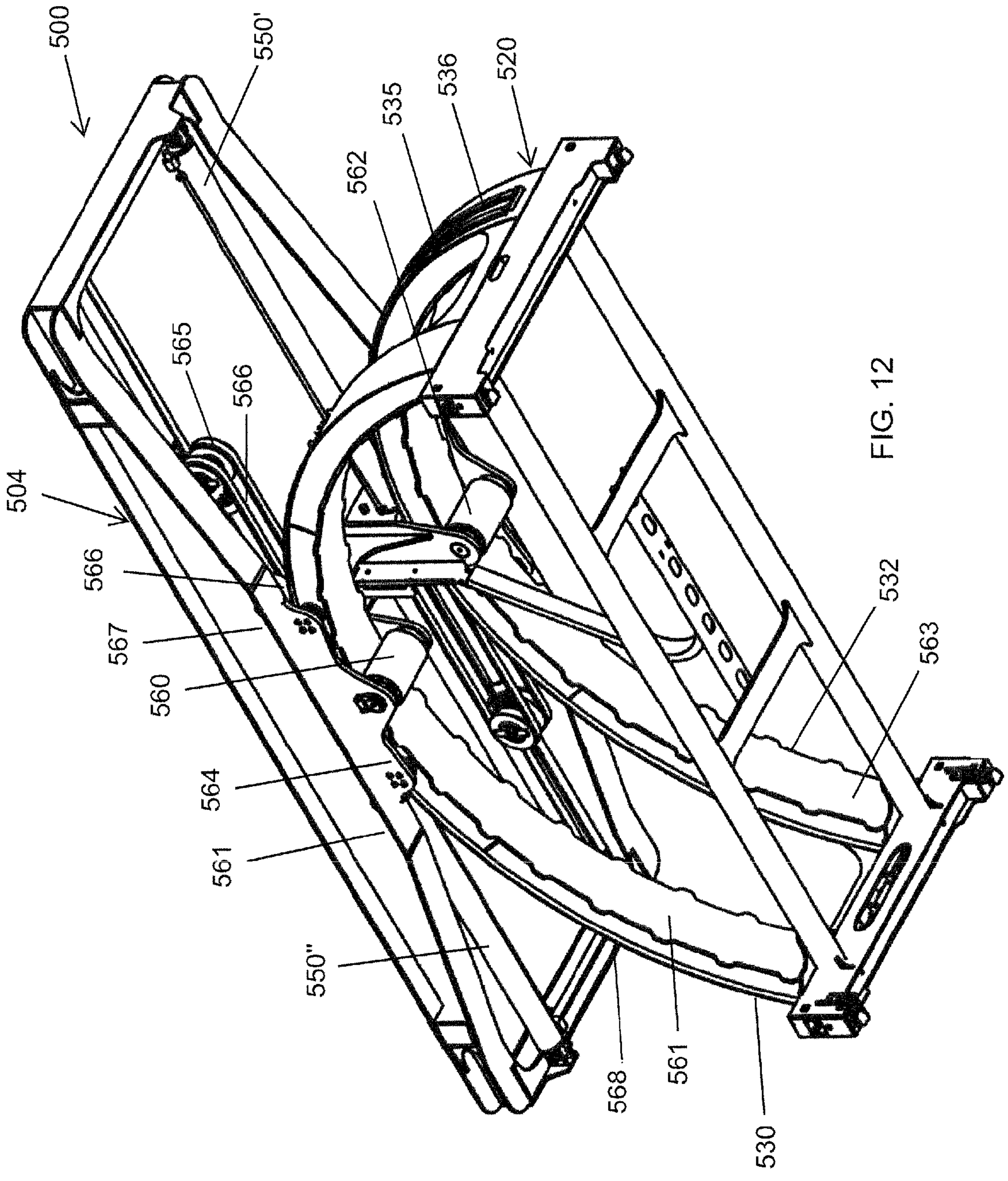
FIG. 12 is a perspective bottom side view of the container tipping apparatus shown in FIG. 11.

As shown in FIG. 12, the upper support structure 504 is provided with a pair of lower extending rollers 560 and 562. The rollers 560 and 562 freely roll along the bottom surfaces 561 and 563, respectively, of the arcuate beams 530 and 532, respectively, so as to support the weight of the lower support structure 520 and any load associated therewith. Additional side rollers 564 and 566 are provided for additional stability and support to the arcuate beam 530 by rolling along the upper lip 568 formed along the outer edge of the arcuate beam 530. A similar pair of rollers (not visible) is provided for the arcuate beam 532. Upper rollers 561 and 567, are coupled to the upper support structure 504 to engage the top surface of the arcuate member 530. The combination of upper and lower rollers maintains the angle of entry and exit of the arcuate members relative to the rollers during operation such that the angle remains substantially constant. This provides for precise control of lower support structure 520 during the tipping operation.

As further illustrated, the motion of the lower support structure 520 relative to the upper support structure 504 is controlled by the actuators 550' and 550", which cooperate with chains 535, 536, 565 and 566, respectively. Utilizing a pair of chains with each actuator provides for an evenly balanced load on the distal end of the piston rods and also provides redundant load control for each side in the unlikely event that one of the chains breaks or breaks free from its attachment during operation. In such an event, the second chain on a given arcuate member can retain the load so as to prevent unwanted tipping of the load in an event of chain failure. Of course, the tipping apparatus 500 could be provided with single chains on each side of the device by running the single chain parallel to the longitudinal axis of the linear actuator.

Figure 13:
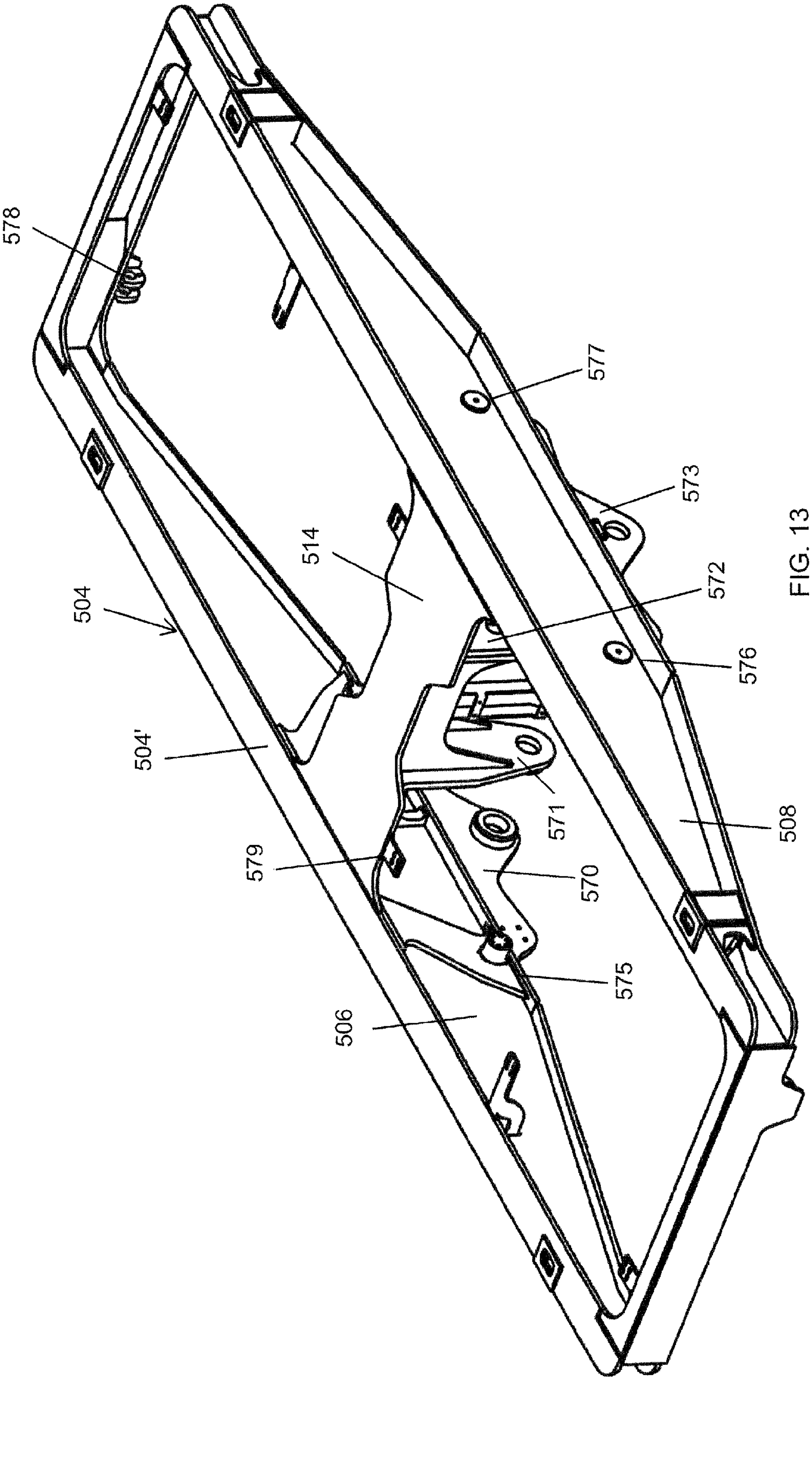
FIG. 13 is a perspective top side view of the upper support structure of the container tipping apparatus shown in FIG. 11.

Referring to FIG. 13, the rectangular frame 504' of the upper support structure is illustrated. The side beams 506 and 508 have a generally I-beam configuration to provide for structural integrity during the loading and tipping operations. The cross-beam 514 is attached between the side beams 506 and 508 as by welding thereto. The side beams 506 and 508 and cross-beam support roller attachment structures, such as structures 570, 571, 572 and 573. In addition, the side beams 506 and 508 include top roller attachments, three of which 575, 576 and 577 are visible. Mounting brackets 578 and 579 are provided for mounting the actuator to the upper support structure 504. Similar mounting brackets are provided on the opposite side for mounting the second actuator.

Figure 14:
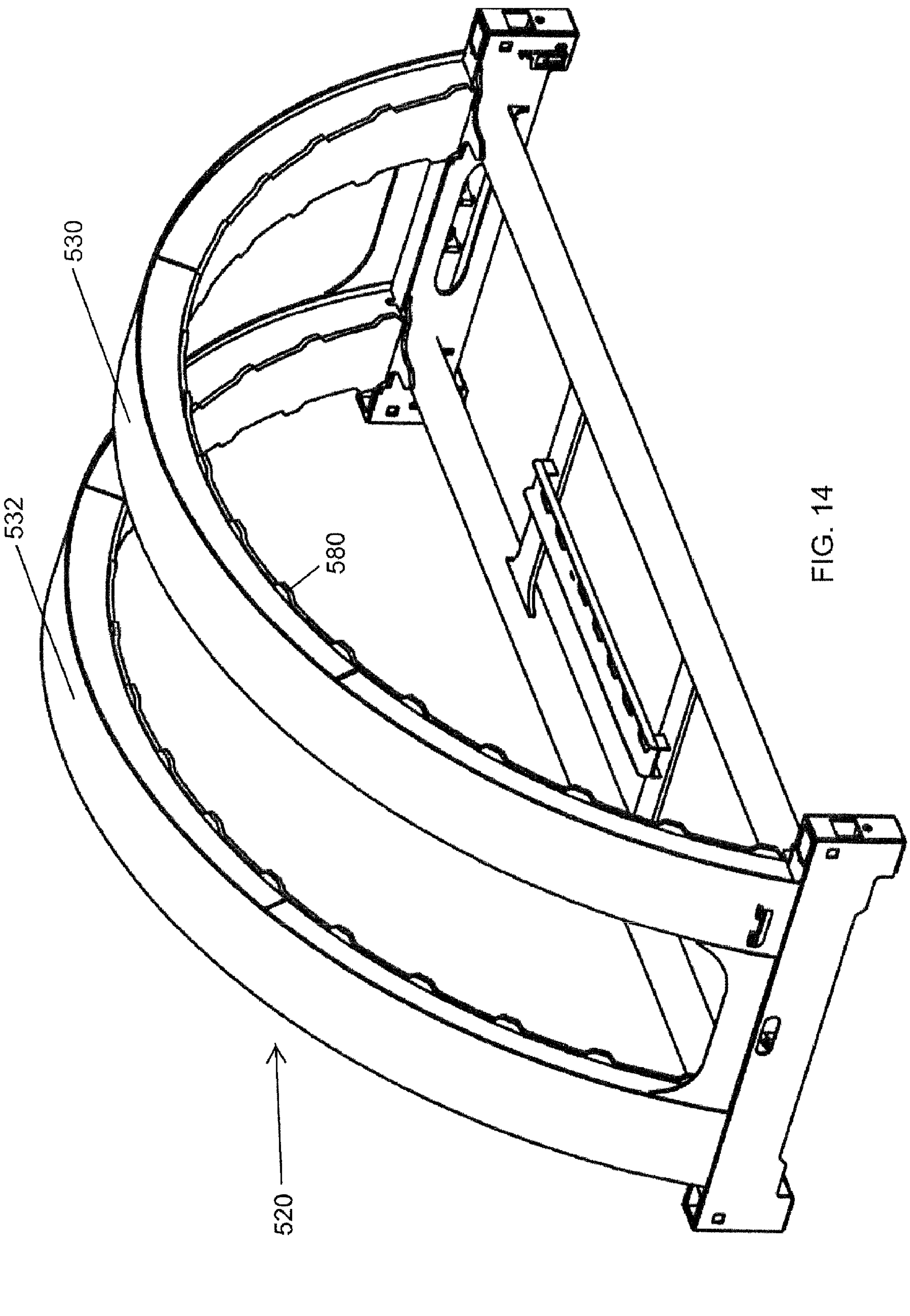
FIG. 14 is a perspective top side view of the lower support structure of the container tipping apparatus shown in FIG. 11.
Figure 15C:
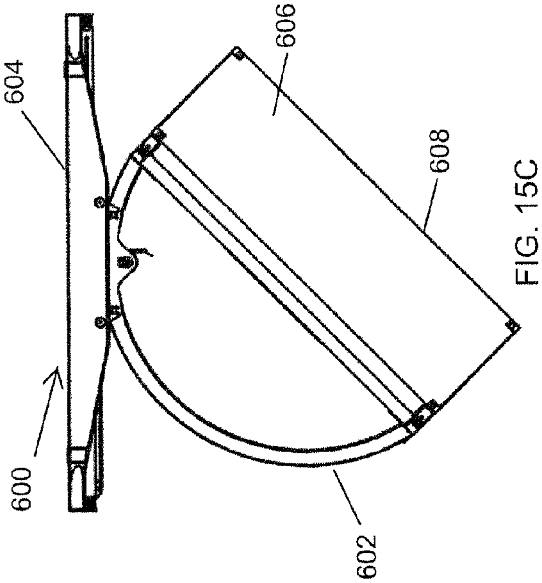
FIGS. 15A-15D are side plan views of a container tipping apparatus and associated load held at different tipping angles according to the principles of the present invention.
Figure 15A:
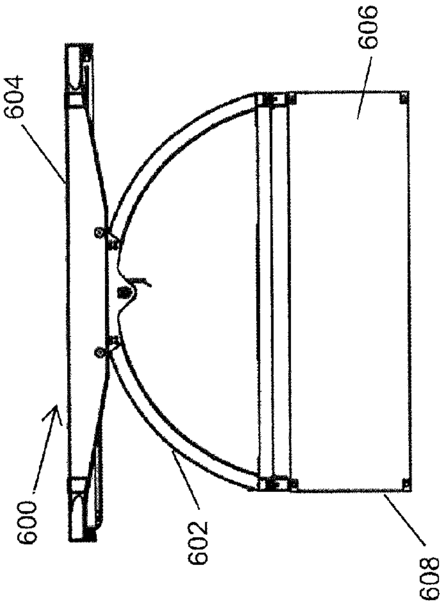
Figure 15D:
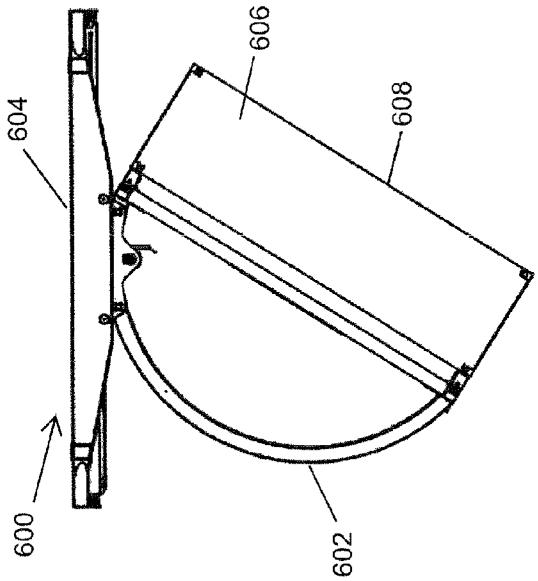
Figure 15B:
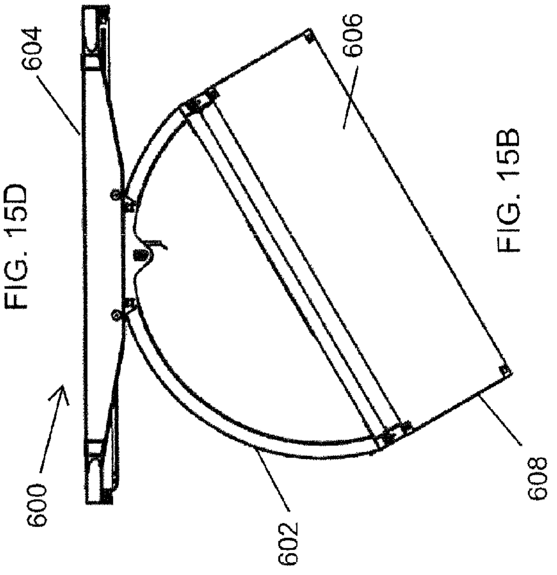

FIG. 14 illustrates the lower support structure 520 of the present invention. The arcuate members 530 and 532 are curved beams having a particular radius that allows for tipping of an intermodal container a sufficient degree that will cause the load inside a container attached to the lower support structure 520 to shift and slide out of the container. By providing a pair of spaced apart curved beams 530 and 532 that are coupled to and supported by the upper support structure, lateral stability of the lower support structure 520 and any associated load is improved. That is, in the event that a load shifts laterally during a tipping operation, the dual curved beam configuration of the lower support structure 520 will prevent the load from causing uncontrollable torque between the lower support structure 520 and the upper support structure 504 shown in FIG. 13. The curved beams 532 and 530 are each configured with a substantially constant radius and are generally semicircular in shape. The beams 530 and 532 are each provided with laterally extending tabs, such as tab 580 that depend from the lower edge of each beam 532 and 530 and are substantially evenly spaced along both sides of each beam 530 and 532. The tabs 580 are provided to maintain alignment between the upper and lower support structures during operation without excessive wear on the sides of the curved beams 530 and 532. In addition, a locking mechanism may be coupled to the upper support structure which can be activated to effectively lock the lower support structure relative to the upper support structure at discrete positions along the arcuate beams 530 and 532 as may be desirable during a tipping operation or when it is desirable to maintain a substantially horizontal position of a load during transport. As such, by causing the upper support structure to engage the lower support structure between the tabs, substantial movement of the lower support structure relative to the upper support structure can be selectively prevented.

FIG. 15 illustrates various positions of a lower support structure 602 and its associated load 606 relative to an upper support structure 604 of a load tipping apparatus 600 of the present invention. In FIG. 15A, the load 606 is maintained in a substantially horizontal position, as may be desirable during transport of the load 606 to a dumping site. In FIG. 15B, the lower support structure 602 and its associated load 606 has been rotated relative to the upper support structure 604 to begin a tipping operation. If the load sufficiently shifts toward the lower end of the surrounding container 608, the tipping operation may be completed in which the load is fully dumped, at which time the container 608 may be returned to the horizontal position shown in FIG. 15A. If additional tipping is desired, the container 608 may be tipped as shown in FIG. 15C or to the maximum tipping angle shown in FIG. 15D, which may be up to about sixty degrees from the horizontal. Of course, while illustrated as being tipped to the left, the tipping apparatus 600 is capable of equally tipping the container 608 to the right in which case the figures would be mirror images. In either case, the center of gravity of the load 606 is substantially maintained during the tipping operation to stabilize the load during the tipping operation that, in the event of a substantial change in the center of gravity of the load during tipping, could result in damage to equipment or injury to personnel. Thus, the tipping apparatus 600 of the present invention provides stability in the load during the tipping operation resulting in less equipment damage and safer tipping operations.

While there have been described various embodiments of the present invention, those skilled in the art will recognize that other and further changes and modifications may be made thereto without department from the spirit of the invention, and it is intended to claim all such changes and modifications that fall within the true scope of the invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods and structures of the present invention are described herein, any methods or structures similar or equivalent to those described herein may by used in the practice or testing of the present invention. All references cited herein are incorporated by reference in their entirety and for all purposes. In addition, while the foregoing advantages of the present invention are manifested in the illustrated embodiments of the invention, a variety of changes can be made to the configuration, design and construction of the invention to achieve those advantages including combinations of components of the various embodiments. Hence, reference herein to specific details of the structure and function of the present invention is by way of example only and not by way of limitation.

What is claimed is:

1. A shipping container tipping apparatus, comprising: a first support structure configured to be releasably mounted to a container transfer device;

a second support structure having an effective length substantially equal to a length of a top of a shipping container and configured to be releasably mounted to the top of the shipping container;

a pair of independent and laterally spaced-apart arcuate members each having first and second ends fixedly attached to the second support structure spanning a substantial length of the second support structure and positioned above the second support structure, said pair of arcuate members movably coupled to said first support structure so that movement of said pair of arcuate members relative to said first support structure causes tipping of the shipping container by lowering one end of the shipping container relative to the other;

a pair of linear actuators coupled to said first support structure in an oppositely facing arrangement; and a pair of chains, each of said pair of chains disposed along at least a portion of an upper arcuate surface of one of said pair of arcuate members and having a first end coupled to a respective one of said pair of arcuate members, with one chain of said pair of chains coupled proximate the first end of one of said air of arcuate members and the other chain of said pair of chains coupled to the second end of the other one of said pair of arcuate members, each actuator of said pair of actuators configured for actuating one of said pair of chains for controlling the movement of said pair of arcuate members relative to said first support structure.

2. The apparatus of claim 1, wherein said first support structure is configured for coupling to a first set of twist locks for releasably mounting said first support structure to the container transfer device and a second set of twist locks coupled to said second support structure for releasably mounting said second support structure to the shipping container.

3. The apparatus of claim 1, further comprising a roller assembly coupled to said first support structure, said roller assembly supporting said at least one arcuate member below said first support structure so that the at least one arcuate member is suspended from said first support structure.

4. The apparatus of claim 3, wherein said roller assembly comprises a plurality of upper rollers and a plurality of lower rollers, the upper rollers engaging a top arcuate surface of said at least one arcuate member and said lower rollers engaging a bottom arcuate surface of said at least one arcuate member.

5. The apparatus of claim 1, wherein said at least one arcuate member is semicircular in shape having said first end of said at least one arcuate member positioned proximate a first end of said second support structure and said second end of said at least one arcuate member positioned proximate said first support structure, and further including a plurality of support members coupling said second end of said at least one arcuate member to said second end of said second support structure.

6. The apparatus of claim 1, further including a power supply and control system for operating the movement of the second support structure relative to the first support structure independently of the container transfer device.

7. The apparatus of claim 6, further comprising a remote control for remotely operating the control system.

8. The apparatus of claim 1, wherein each of the pair of actuators include at least one sprocket at one end thereof for engaging a respective pair of chains along a length thereof with a second end of each chain fixedly coupled to said first support structure.

9. A shipping container tipping apparatus for tipping shipping containers, comprising:

an upper frame configured for attachment to a container transfer device;

a lower frame configured for attachment to a top side of a shipping container and for supporting a weight of the shipping container suspended therefrom;

a pair of laterally spaced arcuate structures interposed between said upper frame and said lower frame with a first end of each of said arcuate structures fixedly coupled proximate a first side of said lower frame and a second end of each of said arcuate structures fixedly coupled proximate a second side of said lower frame so that said lower frame and said ,pair of arcuate structures form a unitary structure;

a roller assembly coupled to said upper frame, said roller assembly comprising at least one lower roller and at least one upper roller, said lower roller engaging and supporting a bottom arcuate surface of said pair of arcuate structures and said upper roller engaging a top arcuate surface of said pair of arcuate structures; and a movement control system configured for selectively moving in a longitudinal manner said pair of arcuate structures relative to said roller assembly resulting in horizontal tilting of said lower support structure relative to said upper support structure in which a first end of the lower frame can be lowered relative to a second end of the lower frame, said movement control system comprising a pair of linear actuators coupled to said upper frame in an oppositely facing arrangement and at least two chains, each of said at least two chains disposed along at least a portion of one of said pair of arcuate structures with one chain of said at least two chains coupled proximate the first end of one of said pair of arcuate members and the other chain of said at least two chains coupled to the second end of the other one of said pair of arcuate structures, each actuator of said pair of actuators configured for actuating at least one of said at east two chain for controlling longitudinal movement of said pair of arcuate members relative to said first support structure.

10. The apparatus of claim 9, wherein said upper frame is configured for attachment to an existing lifting device and said lower frame is configured for attachment to an existing container.

11. The apparatus of claim 10, wherein operational control of the attachment of the upper frame to the existing lifting device, attachment of the lower frame to the existing container and operation of movement control system are controllable by an operator of the existing lifting device.

12. The apparatus of claim 11, further comprising a remote control for remotely operating the control system, the remote control being capable of displaying operational data obtained from said control system.

13. The apparatus of claim 9, wherein said upper frame is configured for coupling to a first set of twist locks for releasably mounting said upper frame to the container transfer device and further including a second set of twist locks coupled to said lower frame for releasably mounting said lower frame to the shipping container.

14. The apparatus of claim 9, wherein said pair of arcuate structures are semicircular in shape.

15. The apparatus of claim 9, wherein said movement control system comprises a pair of self-contained linear actuators.

16. The apparatus of claim 9, wherein each of the pair of actuators includes at least one sprocket at one end thereof for engaging at least one of the at least two chains along a length thereof with a second end of each chain fixedly coupled to said upper frame.

* * * * *